(12) United States Patent
Shirasuna

(10) Patent No.: US 7,864,445 B2
(45) Date of Patent: Jan. 4, 2011

(54) ZOOM LENS AND IMAGE PICKUP APPARATUS INCLUDING THE SAME

(75) Inventor: Takashi Shirasuna, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 19 days.

(21) Appl. No.: 12/470,062

(22) Filed: May 21, 2009

(65) Prior Publication Data

US 2009/0296231 A1  Dec. 3, 2009

(30) Foreign Application Priority Data

May 30, 2008 (JP) .............................. 2008-142352

(51) Int. Cl.
*G02B 15/14* (2006.01)

(52) U.S. Cl. ........................ 359/687; 359/676; 359/686; 359/690

(58) Field of Classification Search ................. 359/676, 359/686–690
See application file for complete search history.

(56) References Cited

U.S. PATENT DOCUMENTS 6,404,561 B1  6/2002  Isono et al.
6,414,799 B1  7/2002  Uzawa et al.
6,594,087 B2  7/2003  Uzawa et al.

FOREIGN PATENT DOCUMENTS

JP  8-248317 A  9/1996

*Primary Examiner*—Darryl J Collins
(74) *Attorney, Agent, or Firm*—Canon U.S.A., Inc. I.P. Division

(57) ABSTRACT

A zoom lens which includes in order from an object side to an image side: a first lens unit with a positive refractive power; a second lens unit with a negative refractive power; and a subsequent lens unit. The second lens unit moves on an optical axis to increase an interval between the first and second lens units during zooming from a wide angle end to a telephoto end. The first lens unit includes a front side lens subunit immovable during focusing with a positive refractive power and a rear side lens subunit movable during focusing with a positive refractive power. A PR lens of the rear side lens subunit and a N2 lens of the second lens unit are made of a material wherein an Abbe number (vd) and a partial dispersion ratio (θgF) are suitably set.

13 Claims, 13 Drawing Sheets

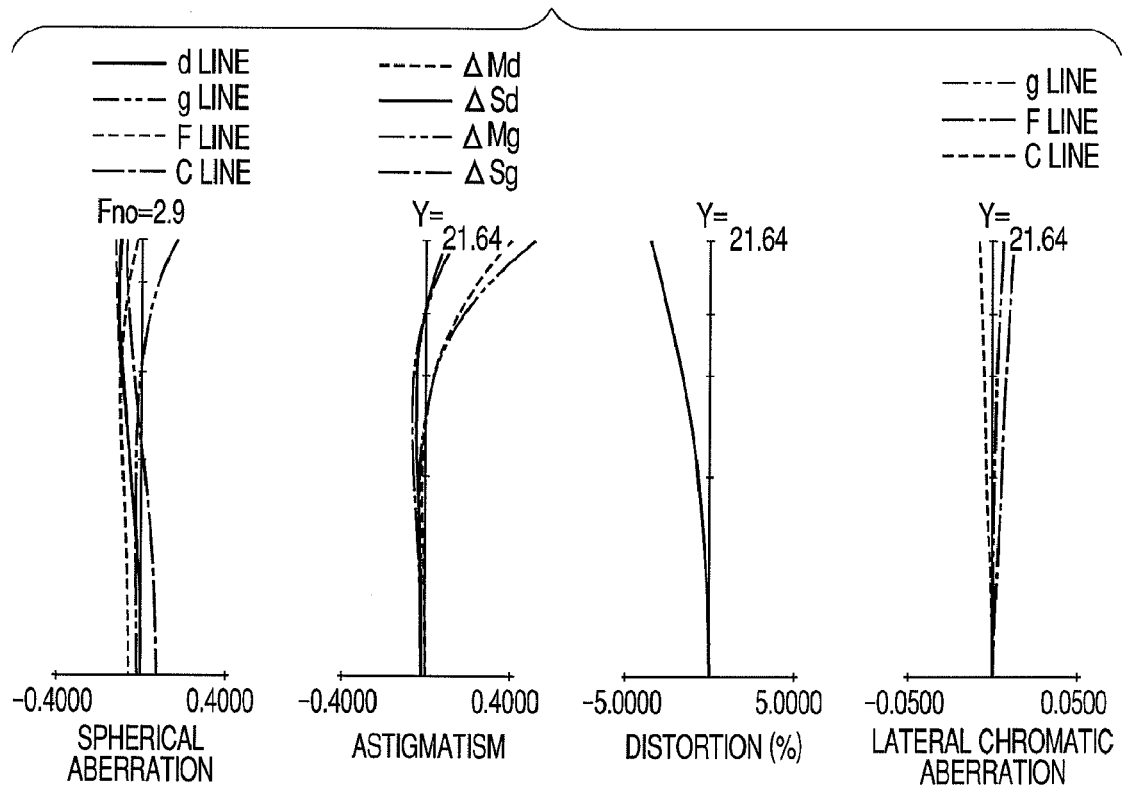
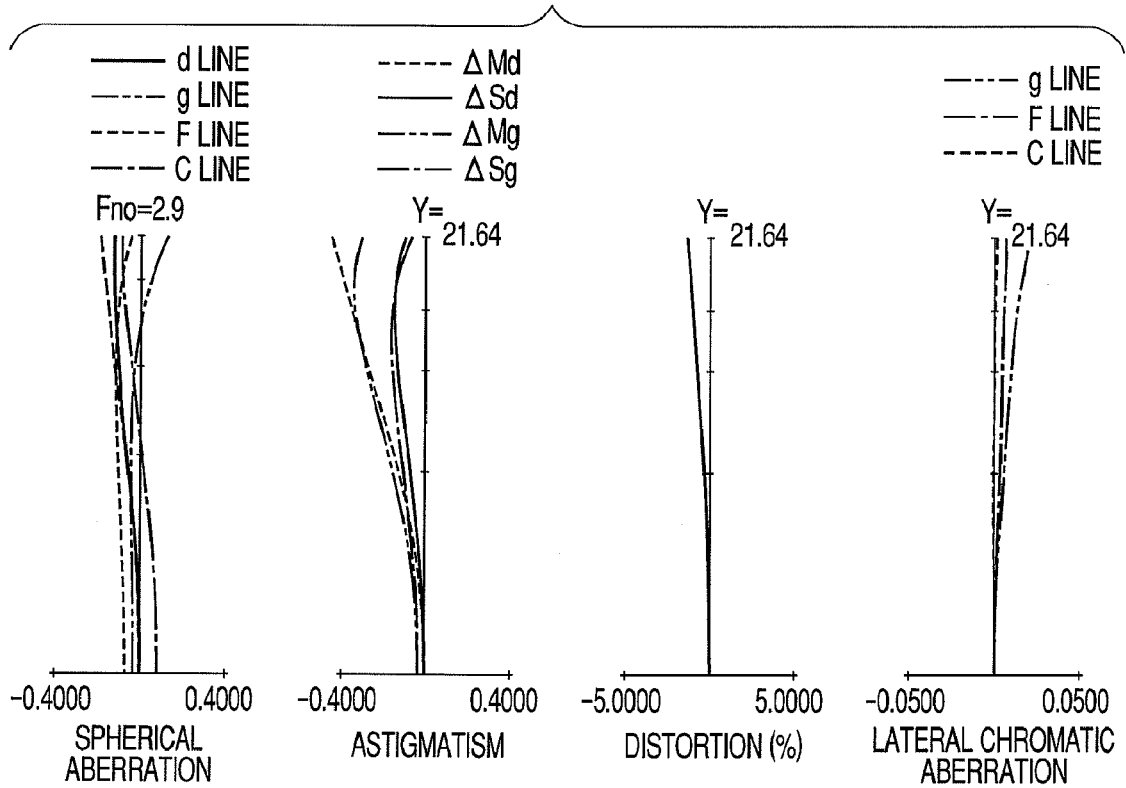

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and is suitable for use in, for example, a broadcasting TV camera, a video camera, a digital still camera, and a silver-halide film camera.

2. Description of the Related Art

In recent years, in an image taking optical system used in an image pickup apparatus such as a TV camera, a silver-halide film camera, a digital camera, and a video camera, a zoom lens which has a high zoom ratio and high optical performance (high resolution) is demanded.

In order to obtain high optical performance, various aberrations related to image performance at a single wavelength, such as spherical aberration and coma, should be excellently corrected. In order to prevent an image from having color blurring in a case where white illumination light is used, chromatic aberrations should be sufficiently corrected.

In order to expand an image taking region, a zoom lens having a high zoom ratio is required.

In general, when the zoom ratio increases, significant lateral chromatic aberration is generated at a zoom position located on the wide angle side, and significant lateral chromatic aberration and on-axis chromatic aberration are generated at a zoom position located on the telephoto side.

The chromatic aberrations increase as a total lens length (distance between first surface and imaging plane, which is also referred to as total optical length) shortens.

When the chromatic aberrations are to be corrected, it is important to excellently correct not only a primary spectrum but also a secondary spectrum in order to obtain high-quality image performance.

There has been known, as a telephoto type zoom lens, a zoom lens which includes four lens units constituted by a lens unit having a positive refractive power, a lens unit having a negative refractive power, a lens unit having a positive refractive power, and a lens unit having a positive refractive power, which are provided in order from the object side to the image side. There has been known, as the zoom lens including the four lens units, a zoom lens in which chromatic aberrations are corrected using a lens made of an extraordinary dispersion material (see, for example, U.S. Pat. No. 6,414,799, Japanese Patent Application Laid-Open No. H08-248317, U.S. Pat. No. 6,404,561, and U.S. Pat. No. 6,594,087).

A material with large extraordinary dispersion property, such as a fluorite, normally has a low refractive index. Therefore, in order to correct a secondary spectrum using a lens made of such a glass material, it is necessary to suitably set a lens structure and lens material of each of the lens units.

In a zoom lens using a lens made of an optical material such as low-dispersion glass with a large Abbe number, such as a fluorite, when a refractive power of a lens surface is not significantly changed, chromatic aberrations do not change. Therefore, it is important for the zoom lens having the high zoom ratio to employ a lens structure capable of correcting chromatic aberrations and various aberrations such as spherical aberration, coma, and astigmatism over the entire zoom range in a balanced manner.

For example, in order to obtain high optical performance of the zoom lens including the four lens units over the entire zoom range and the entire focusing range (entire object length range), it is important to suitably set a lens structure of the second lens unit for magnification and a lens structure of the first lens unit for focusing. It is also important to suitably set a material of each lens used for the first lens unit and the second lens unit.

However, when the lens structure, for example, power or a material to be used, of the second lens unit or the lens structure of the first lens unit is unsuitably selected, it is difficult to excellently correct the chromatic aberrations to obtain the high optical performance over the entire zoom range and the entire focusing range.

SUMMARY OF THE INVENTION

A zoom lens according to the present invention comprises, in order from an object side to an image side: a first lens unit having a positive refractive power; a second lens unit which has a negative refractive power and includes a negative lens; and a subsequent lens group including at least one lens unit, wherein at least the second lens unit is moved on an optical axis so as to increase an interval between the first lens unit and the second lens unit during zooming from a wide angle end to a telephoto end, wherein the first lens unit comprises: a front lens subunit which is not moved during focusing and has a positive refractive power; and a rear lens subunit which is moved during the focusing and has a positive refractive power, wherein the rear lens subunit includes a positive lens, wherein the positive lens included in the rear lens subunit is identified as a PR lens and the negative lens included in the second lens unit is identified as a N2 lens, and wherein the PR lens and the N2 lens are made of a material satisfying the following conditions: $60 < \nu d$; and $-0.0015 \times \nu d + 0.6425 < \theta gF$, where $\nu d$ denotes an Abbe number of the material and $\theta gF$ denotes a partial dispersion ratio of the material.

According to the present invention, the zoom lens having high optical performance over the entire zoom range and the entire focusing range can be realized.

Further features of the present invention become apparent from the following description of exemplary embodiments with reference to the attached drawings.

BRIEF DESCRIPTION OF THE DRAWINGS

FIGS. 8A and 8B are aberration charts in the standard state and the focusing state at the object distance of 1.5 m in Numerical Embodiment 3 of the present invention at the wide angle end.

DESCRIPTION OF THE EMBODIMENTS

Hereinafter, a zoom lens according to each of embodiments of the present invention and an image pickup apparatus including the zoom lens are described.

The zoom lens according to the present invention includes a first lens unit having a positive refractive power, a second lens unit having a negative refractive power, and a subsequent lens group including at least one lens unit, which are provided in order from an object side to an image side.

During zooming from a wide angle end to a telephoto end, at least the second lens unit moves on an optical axis so as to increase an interval between the first lens unit and the second lens unit.

The first lens unit includes a front lens subunit which is not moved during focusing and has a positive refractive power and a rear lens subunit which is moved during the focusing and has a positive refractive power.

In each of the embodiments of the present invention described later, the subsequent lens group includes a third lens unit having a positive refractive power and a fourth lens unit having a positive refractive index, which are provided in order from the object side to the image side.

The subsequent lens group may include only the third lens unit. Alternatively, the subsequent lens group may further include at least one lens unit located on the object side of the fourth lens unit, and thus include at least three lens units.

Figure 1:
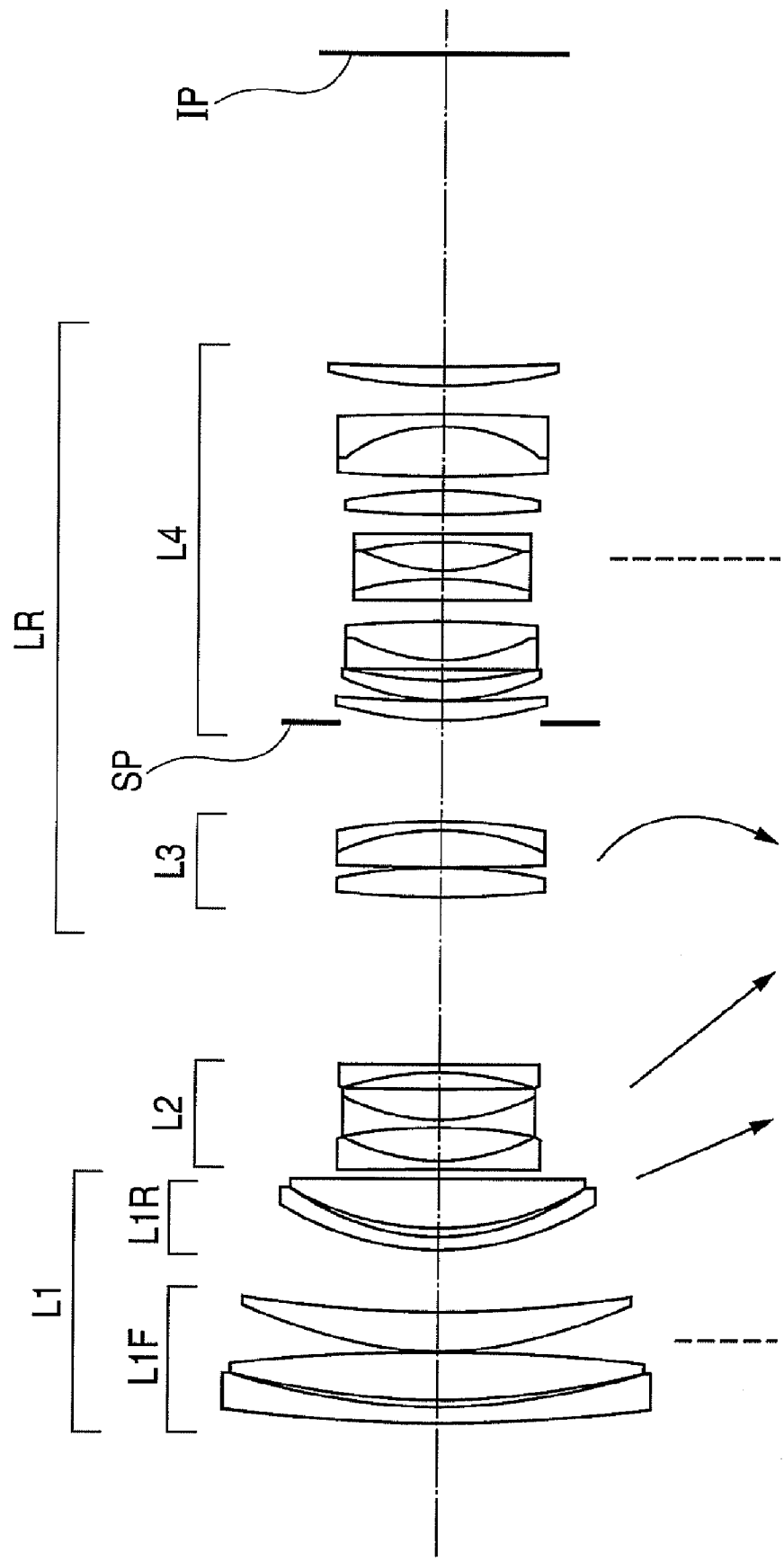
FIG. 1 is a lens cross sectional view illustrating a zoom lens according to Numerical Embodiment 1 of the present invention at a wide angle end.

FIG. 1 is a lens cross sectional view illustrating a zoom lens according to Embodiment 1 of the present invention at the wide angle end (short-focal length end).

Figure 2A:
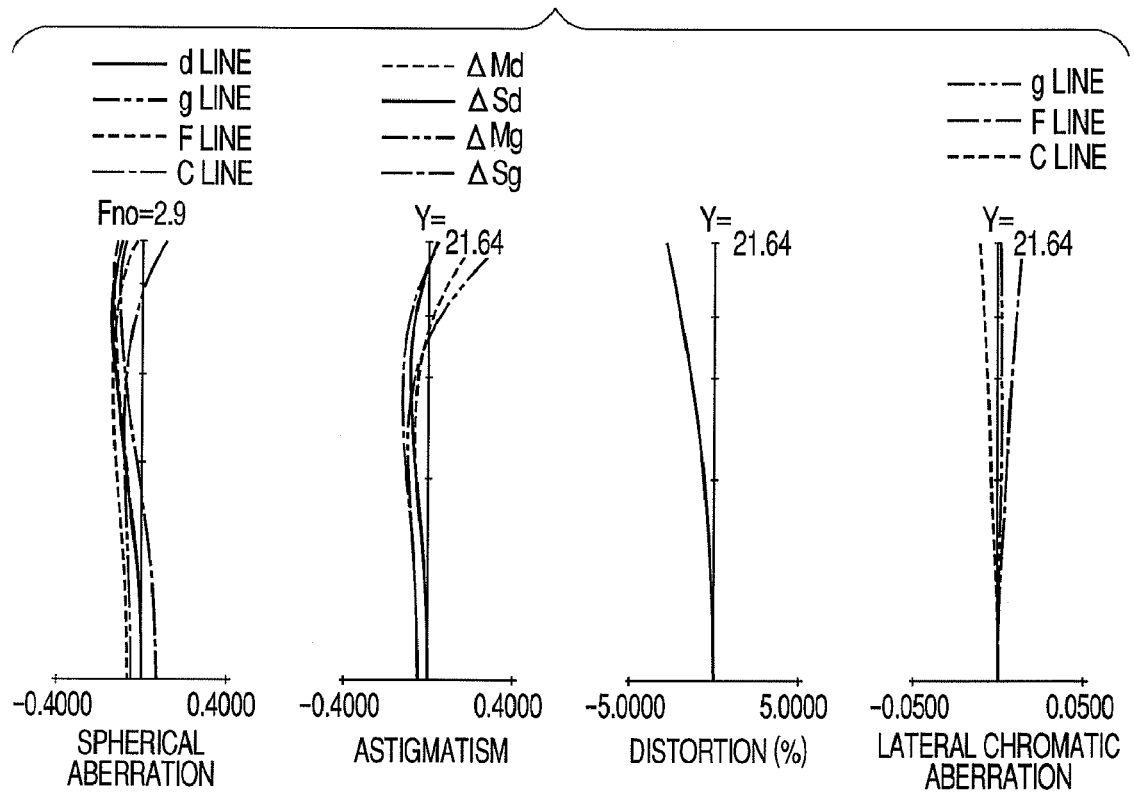
FIGS. 2A and 2B are aberration charts in a standard state and a focusing state at an object distance of 1.5 m in Numerical Embodiment 1 of the present invention at the wide angle end.
Figure 2B:
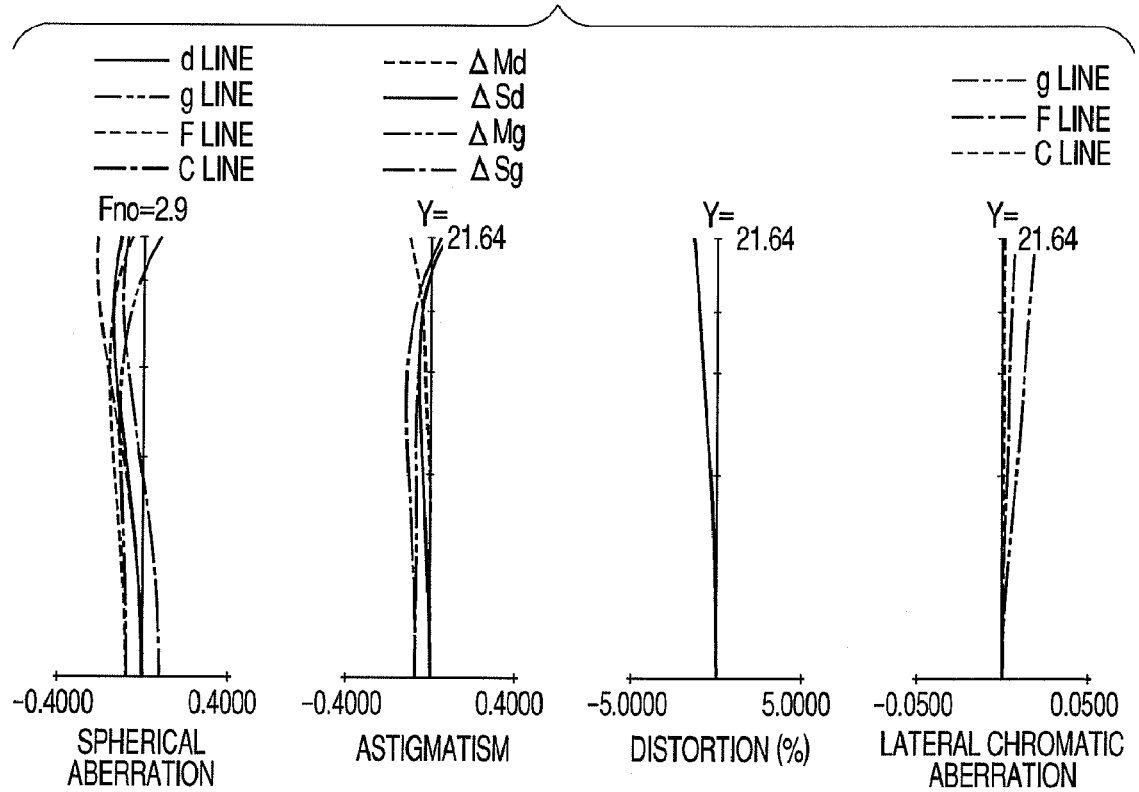

FIGS. 2A and 2B are aberration charts in an infinite object distance (standard state) and an object distance of 1.5 m at the wide angle end of the zoom lens according to Embodiment 1.

Figure 3A:
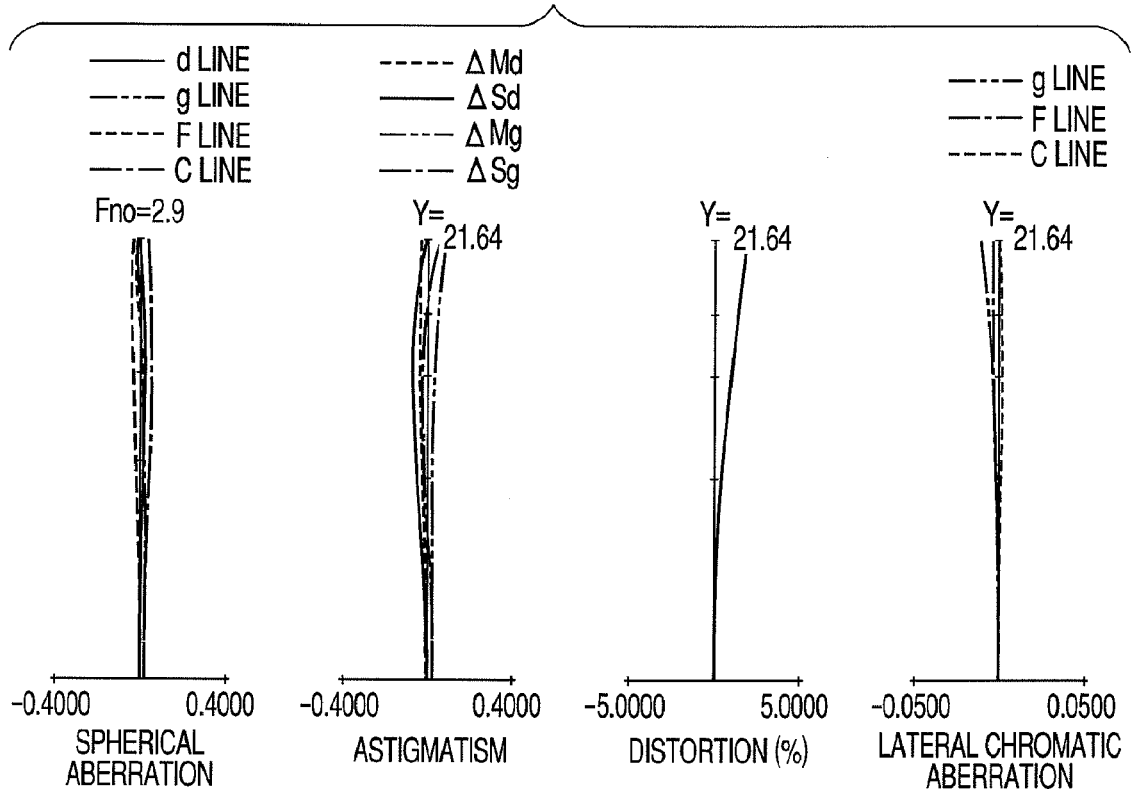
FIGS. 3A and 3B are aberration charts in the standard state and the focusing state at the object distance of 1.5 m in Numerical Embodiment 1 of the present invention at a telephoto end.
Figure 3B:
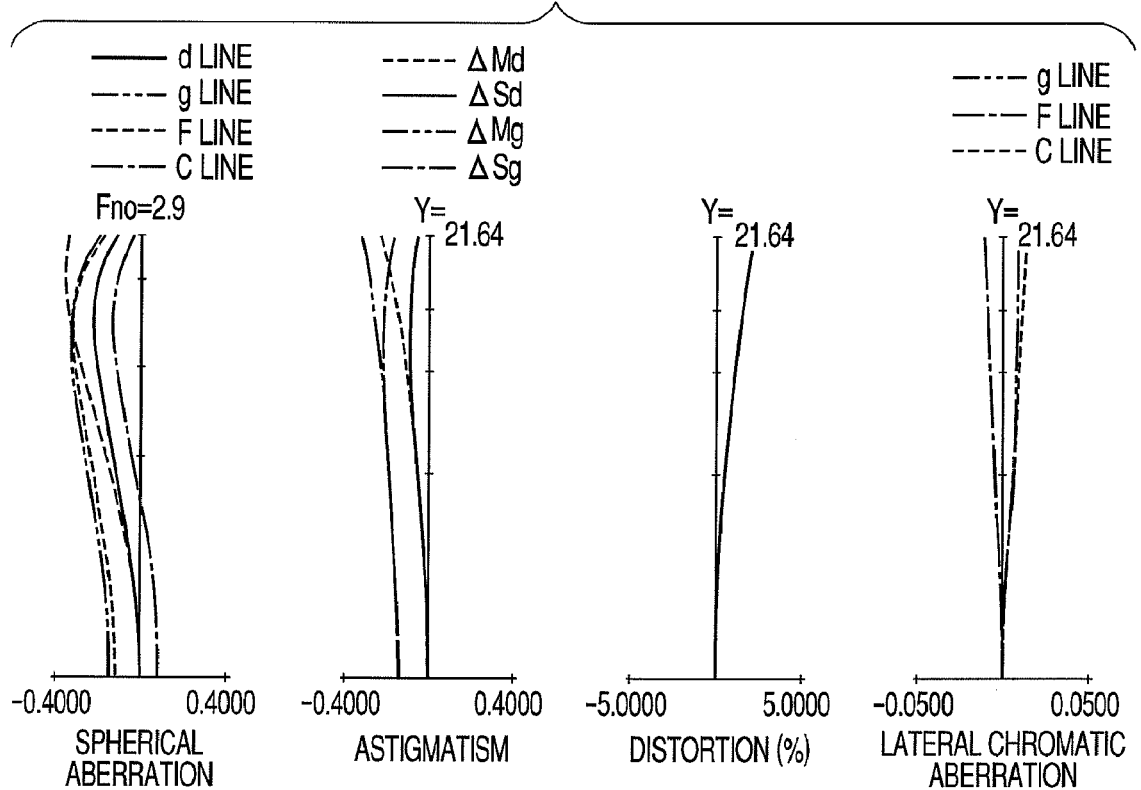

FIGS. 3A and 3B are aberration charts in the infinite object distance and the object distance of 1.5 m at the telephoto end (long-focal length end) of the zoom lens according to Embodiment 1.

Figure 4:
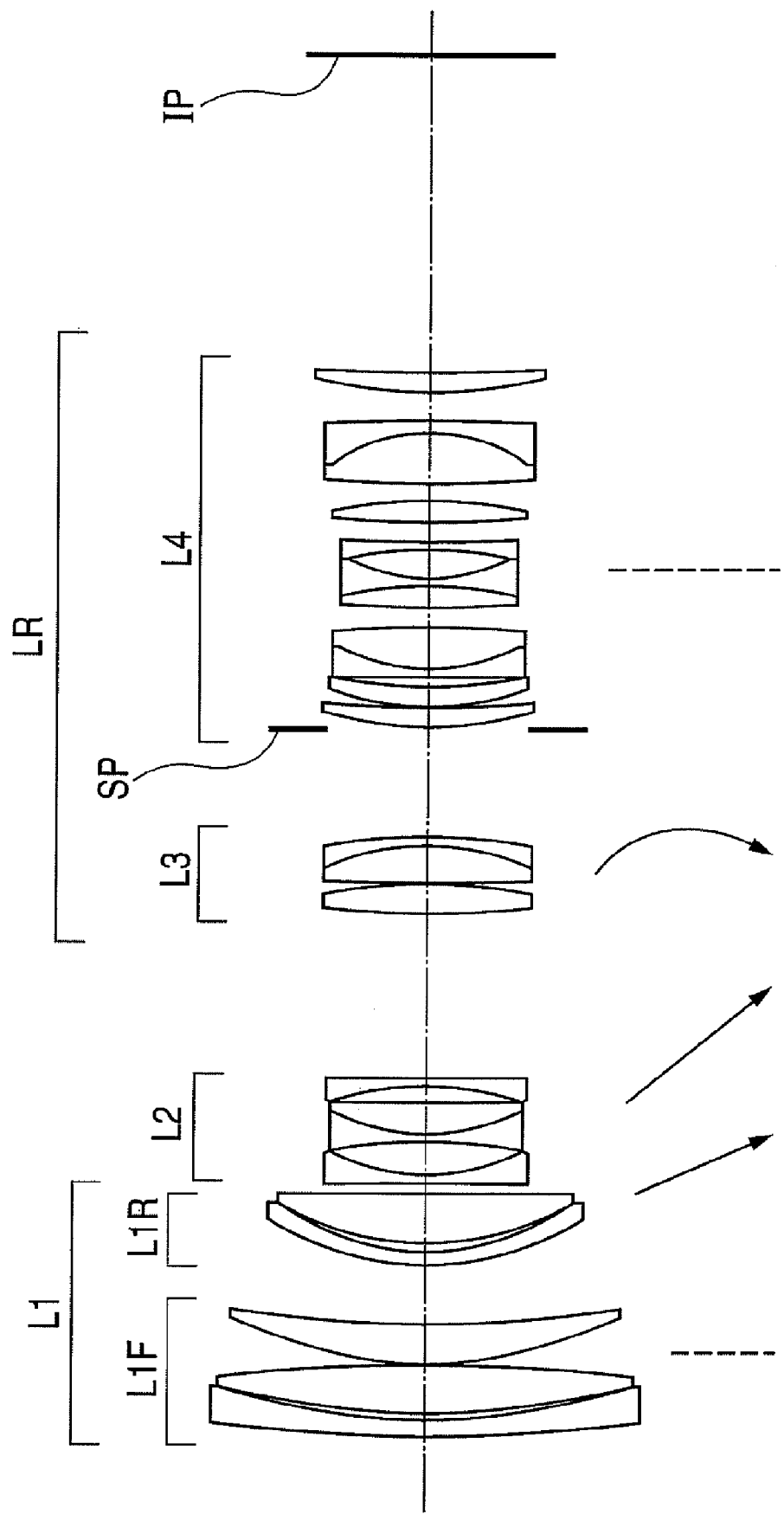
FIG. 4 is a lens cross sectional view illustrating a zoom lens according to Numerical Embodiment 2 of the present invention at the wide angle end.

FIG. 4 is a lens cross sectional view illustrating a zoom lens according to Embodiment 2 of the present invention at the wide angle end.

Figure 5A:
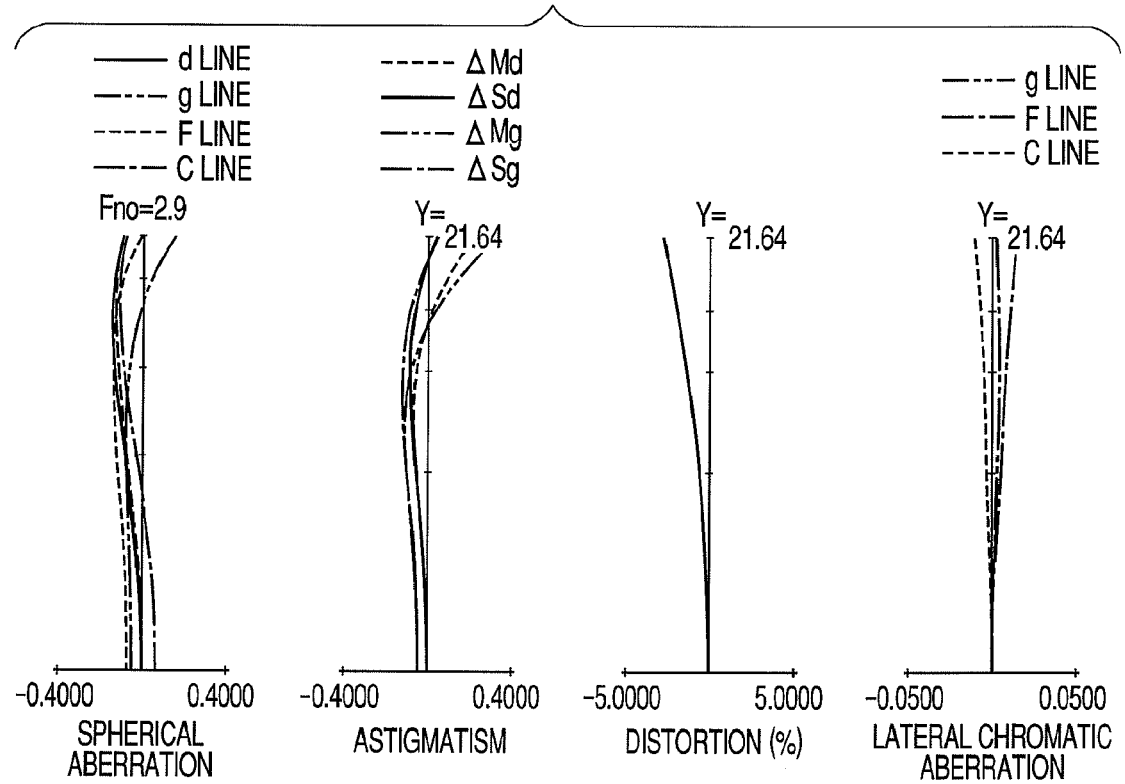
FIGS. 5A and 5B are aberration charts in the standard state and the focusing state at the object distance of 1.5 m in Numerical Embodiment 2 of the present invention at the wide angle end.
Figure 5B:
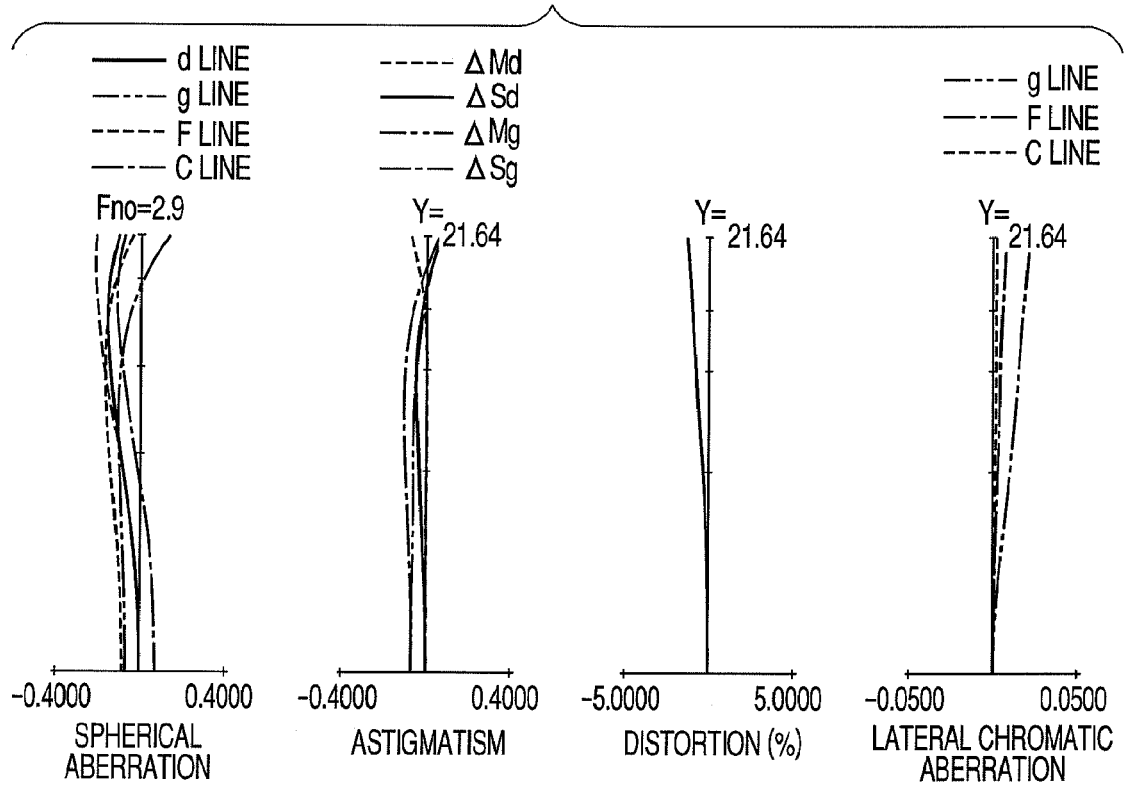

FIGS. 5A and 5B are aberration charts in the infinite object distance and the object distance of 1.5 m at the wide angle end of the zoom lens according to Embodiment 2.

Figure 6A:
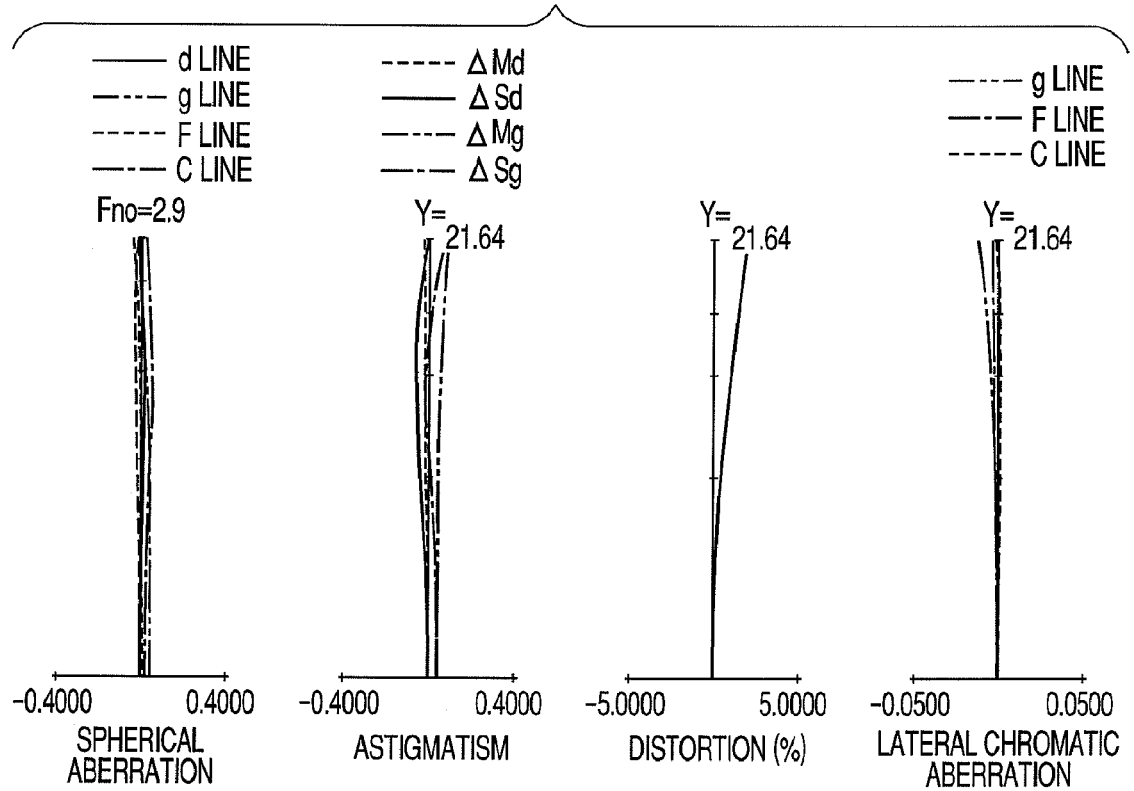
FIGS. 6A and 6B are aberration charts in the standard state and the focusing state at the object distance of 1.5 m in Numerical Embodiment 2 of the present invention at the telephoto end.
Figure 6B:
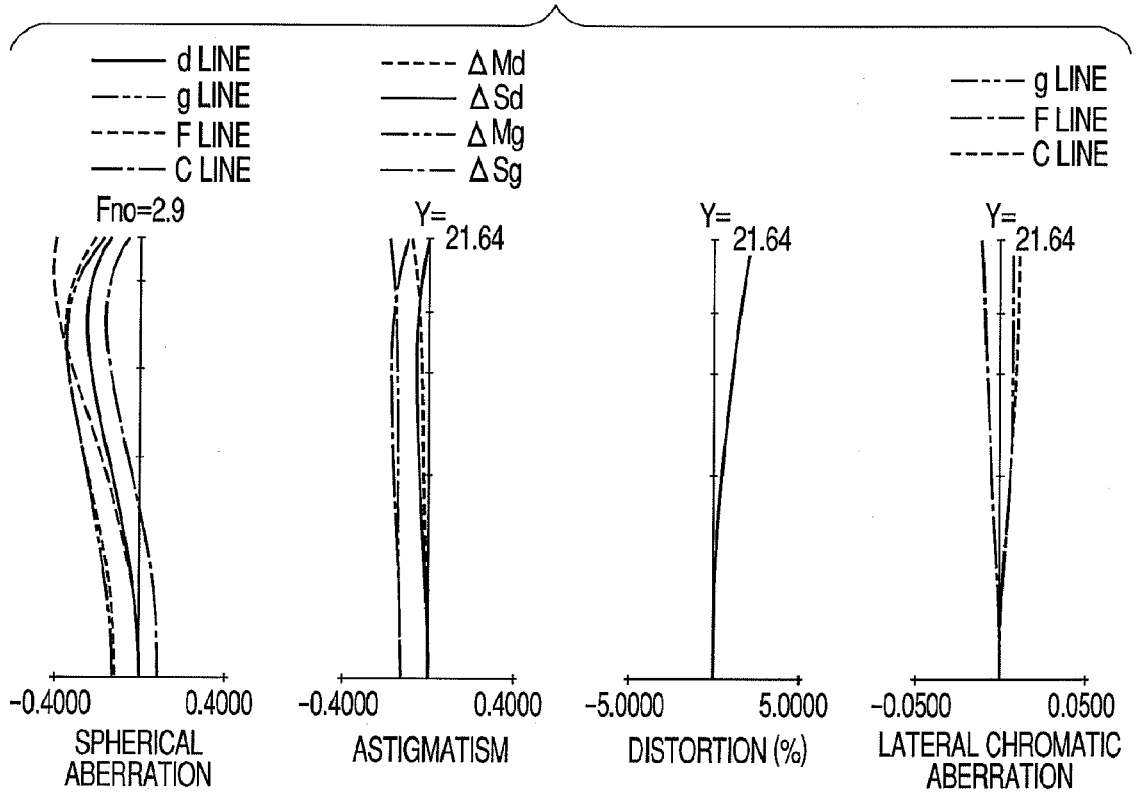

FIGS. 6A and 6B are aberration charts in the infinite object distance and the object distance of 1.5 m at the telephoto end of the zoom lens according to Embodiment 2.

Figure 7:
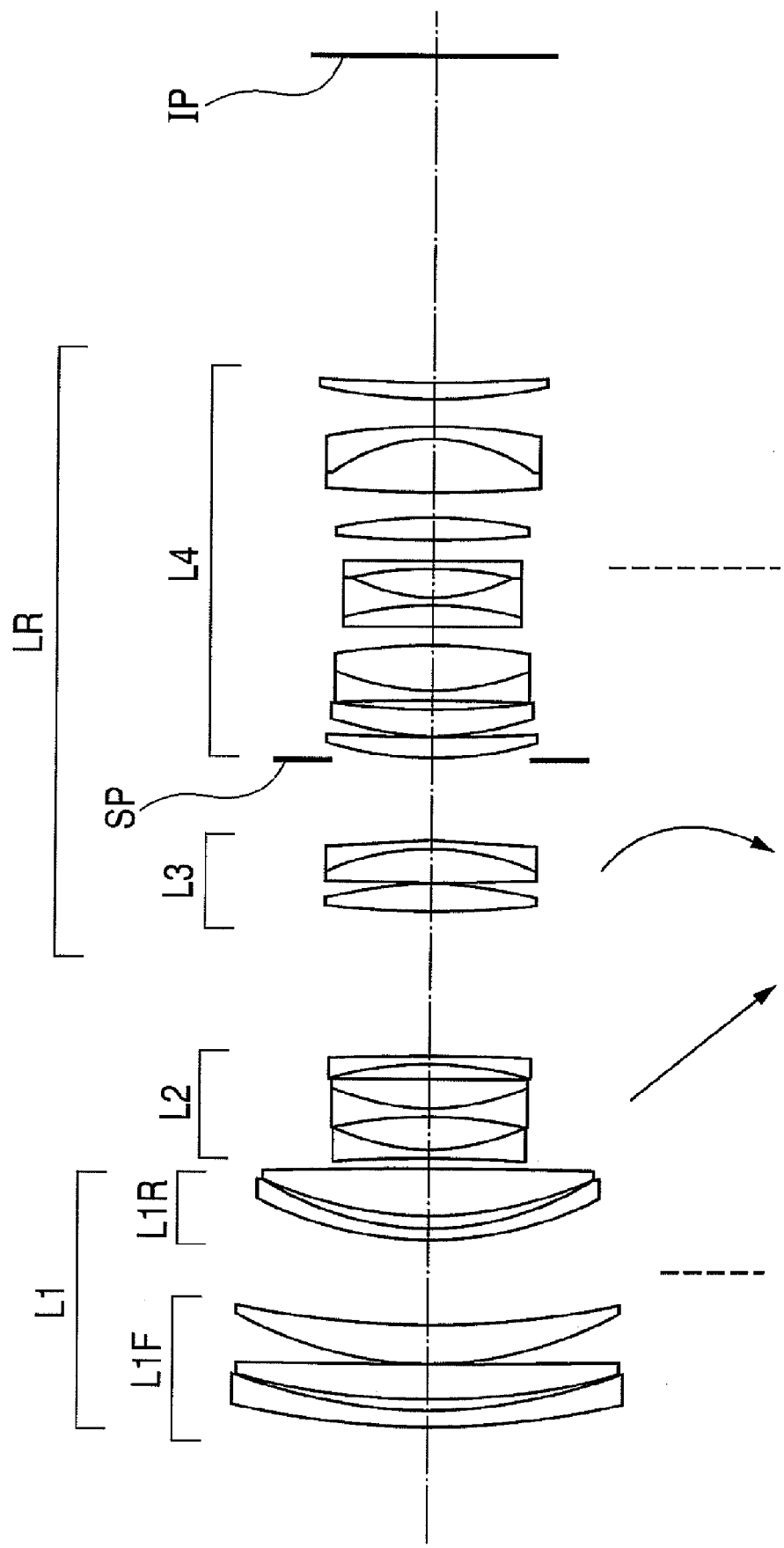
FIG. 7 is a lens cross sectional view illustrating a zoom lens according to Numerical Embodiment 3 of the present invention at the wide angle end.

FIG. 7 is a lens cross sectional view illustrating a zoom lens according to Embodiment 3 of the present invention at the wide angle end.

FIGS. 8A and 8B are aberration charts in the infinite object distance and the object distance of 1.5 m at the wide angle end of the zoom lens according to Embodiment 3.

Figure 9A:
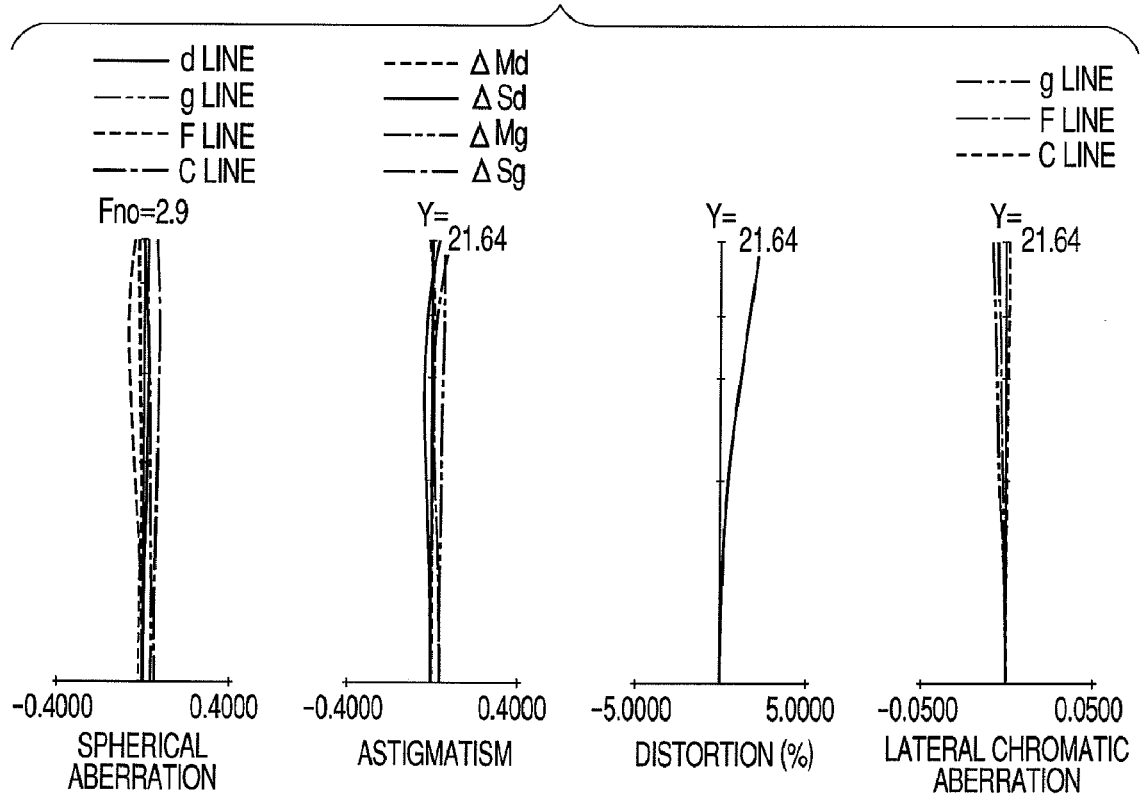
FIGS. 9A and 9B are aberration charts in the standard state and the focusing state at the object distance of 1.5 m in Numerical Embodiment 3 of the present invention at the telephoto end.
Figure 9B:
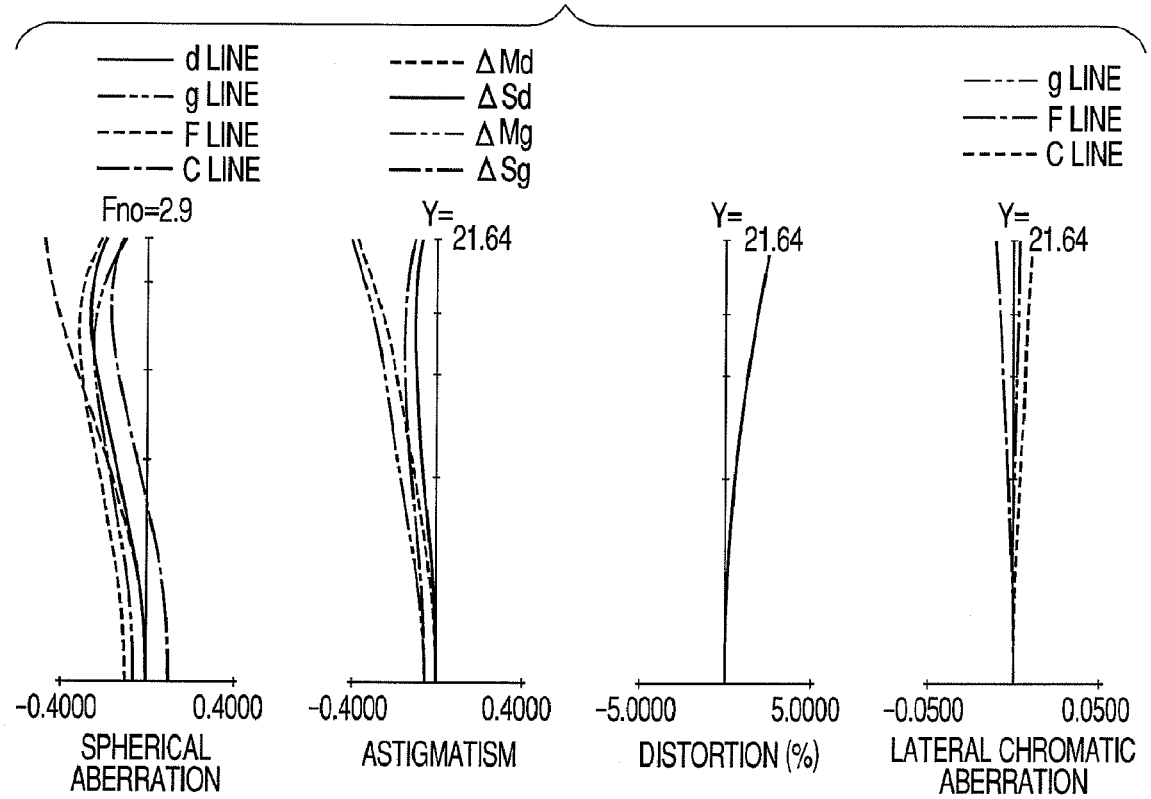

FIGS. 9A and 9B are aberration charts in the infinite object distance and the object distance of 1.5 m at the telephoto end of the zoom lens according to Embodiment 3.

Figure 10:
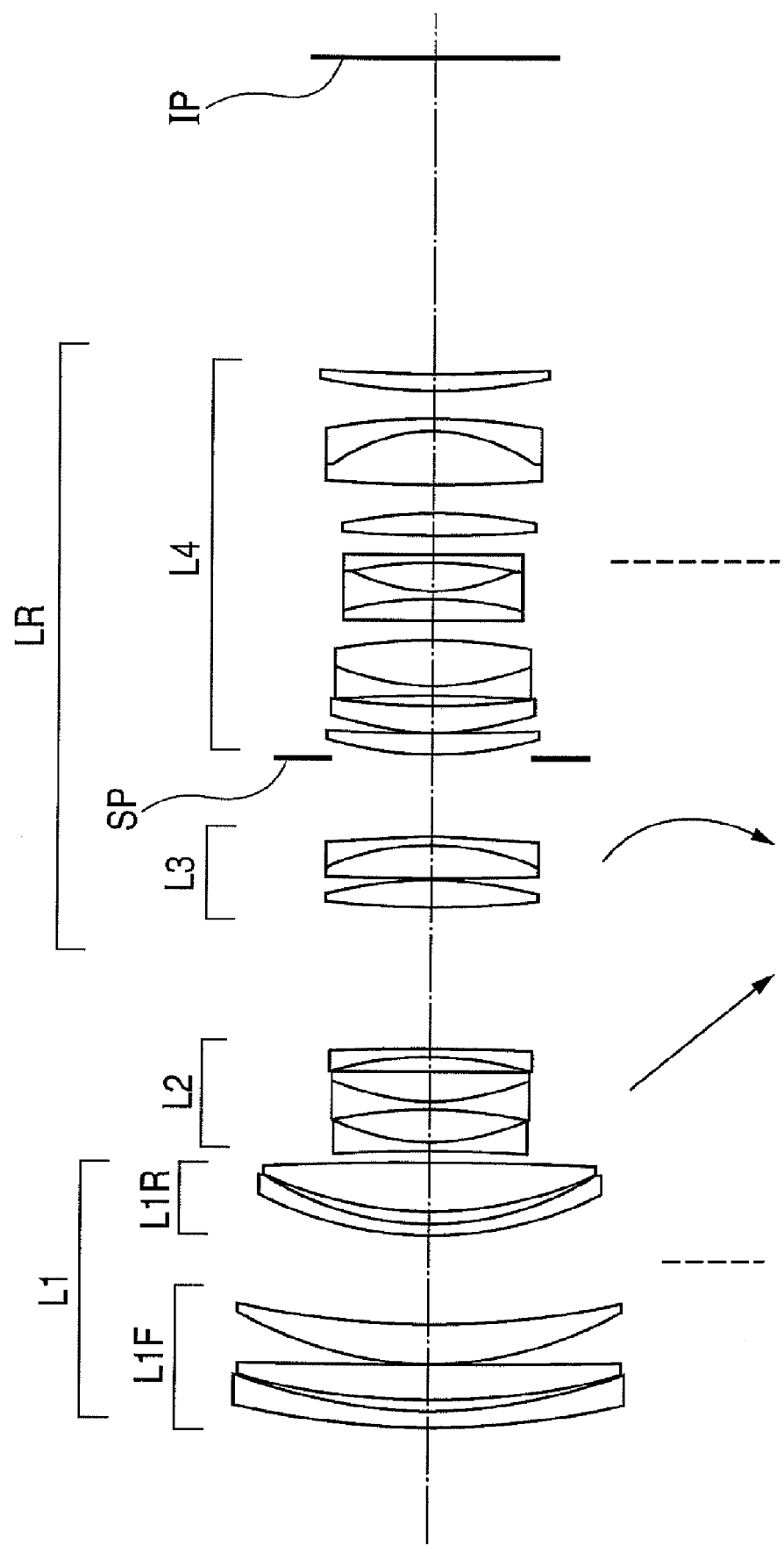
FIG. 10 is a lens cross sectional view illustrating a zoom lens according to Numerical Embodiment 4 of the present invention at the wide angle end.

FIG. 10 is a lens cross sectional view illustrating a zoom lens according to Embodiment 4 of the present invention at the wide angle end.

Figure 11A:
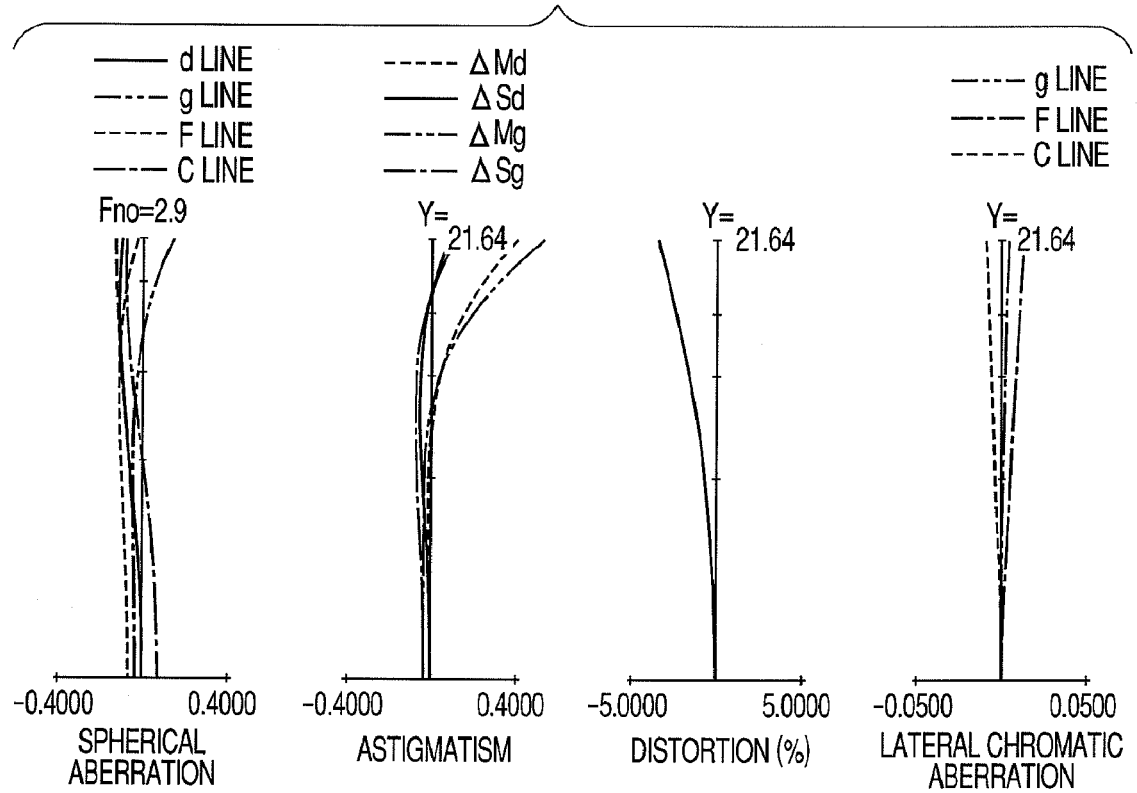
FIGS. 11A and 11B are aberration charts in the standard state and the focusing state at the object distance of 1.5 m in Numerical Embodiment 4 of the present invention at the wide angle end.
Figure 11B:
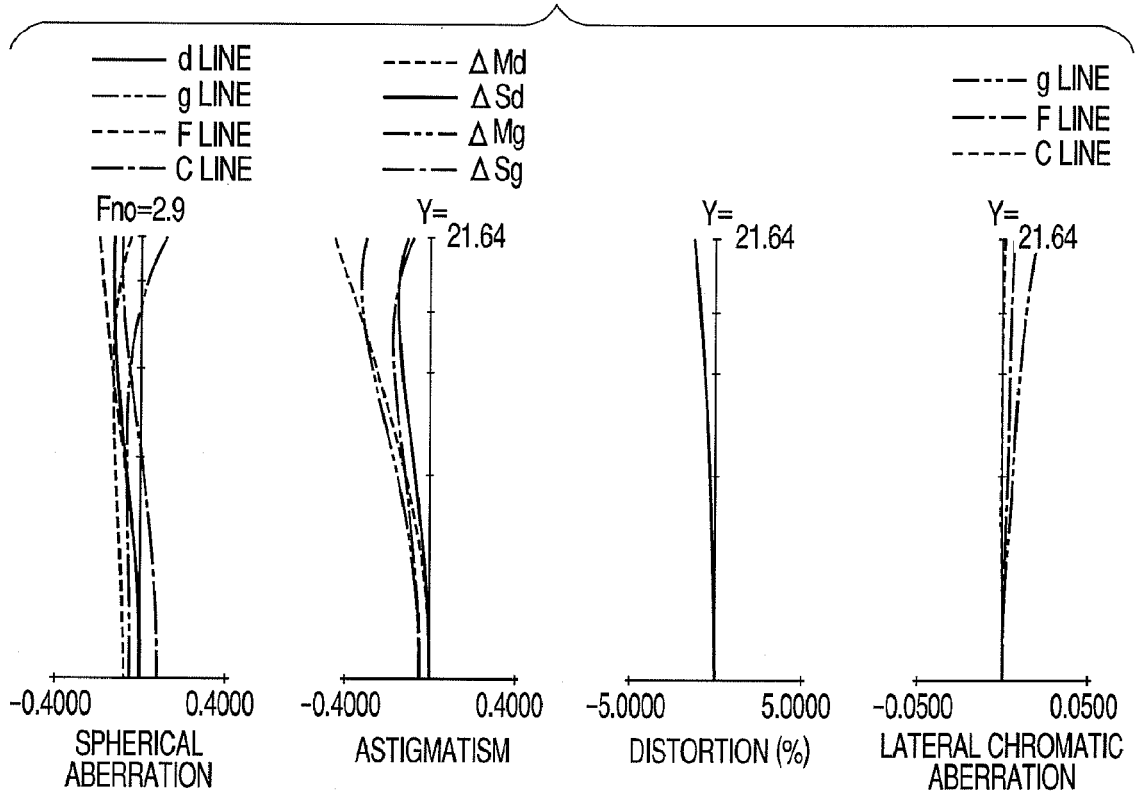

FIGS. 11A and 11B are aberration charts in the infinite object distance and the object distance of 1.5 m at the wide angle end of the zoom lens according to Embodiment 4.

Figure 12A:
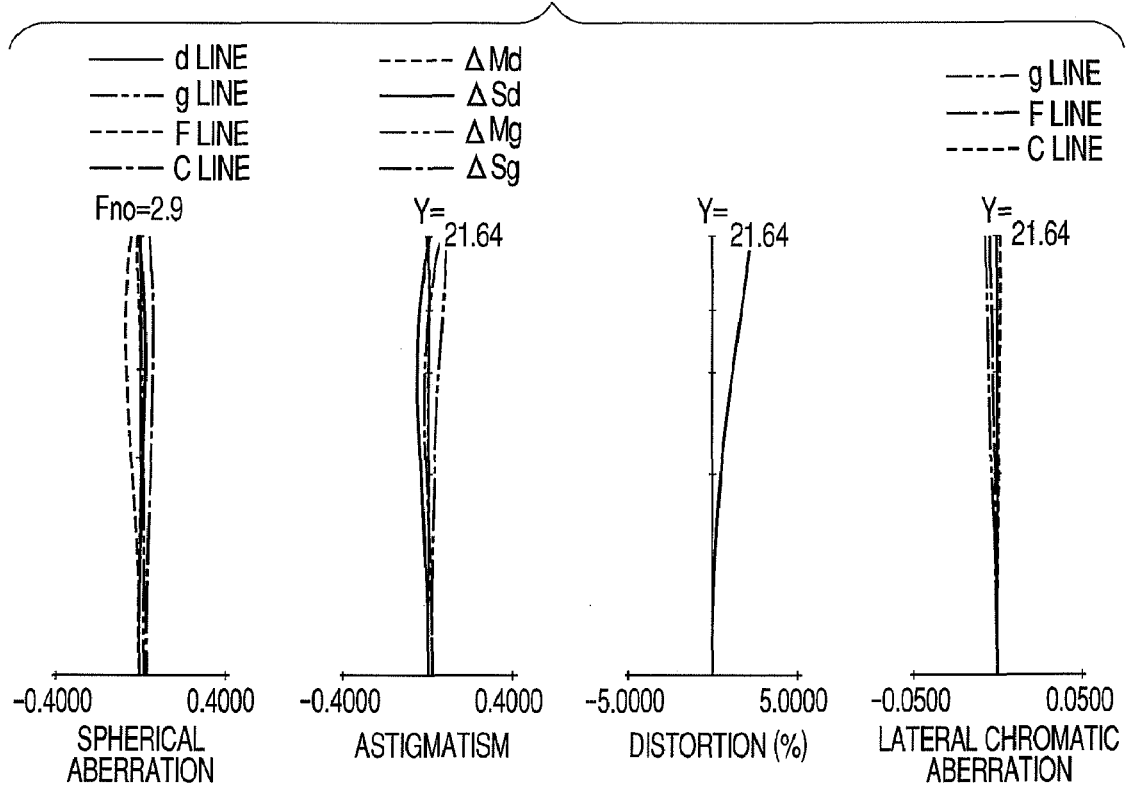
FIGS. 12A and 12B are aberration charts in the standard state and the focusing state at the object distance of 1.5 m in Numerical Embodiment 4 of the present invention at the telephoto end.
Figure 12B:
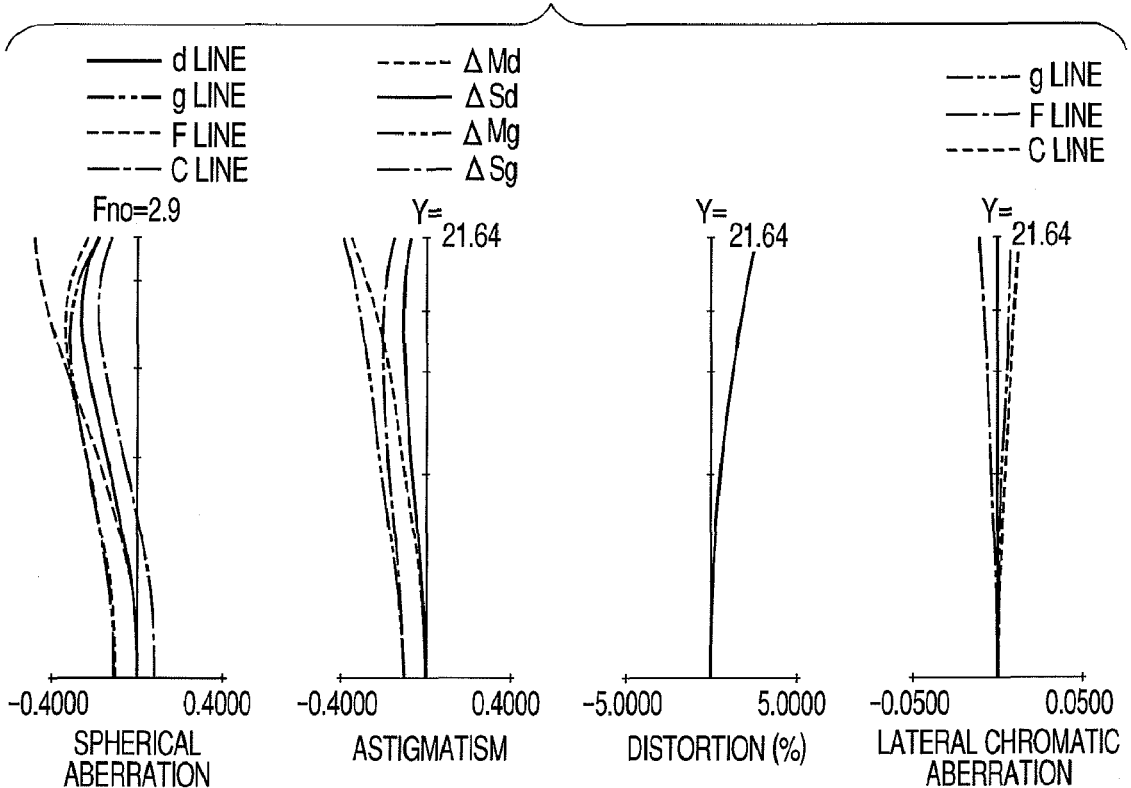

FIGS. 12A and 12B are aberration charts in the infinite object distance and the object distance of 1.5 m at the telephoto end of the zoom lens according to Embodiment 4.

Figure 13:
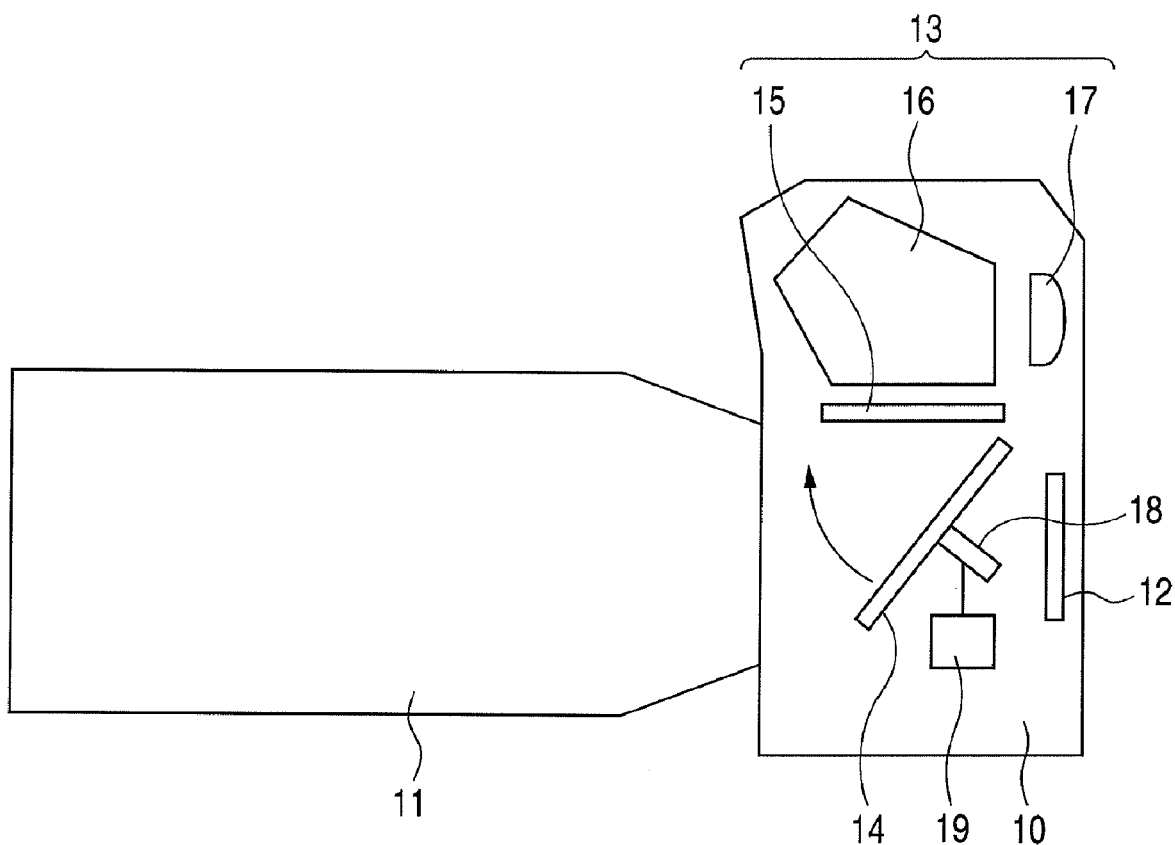
FIG. 13 is a schematic principal view illustrating an image pickup apparatus according to the present invention.

FIG. 13 is a schematic principal view illustrating an image pickup apparatus according to the present invention.

The zoom lens according to each of the embodiments is an image taking lens system used for an image pickup apparatus such as a video camera, a digital camera, or a silver-halide film camera. In the lens cross sectional views of FIGS. 1, 4, 7, and 10, the left is the object side (front side) and the right is the image side (rear side). In the lens cross sectional views of FIGS. 1, 4, 7, and 10, reference symbol "i" denotes a lens unit order counted from the object side and reference symbol Li denotes an i-th lens unit.

A subsequent lens group LR includes at least one lens unit. A first lens unit L1 has a positive refractive power. A second lens unit (variator lens unit) L2 is movable during zooming and has a negative refractive power. A third lens unit (compensator lens unit) L3 is movable during zooming and has a positive refractive power for correcting a variation in imaging plane position due to magnification. A fourth lens unit (relay lens unit) L4 is used for imaging.

The third and fourth lens units L3 and L4 are included in the subsequent lens group LR. A front lens subunit L1F is not moved (is fixed) during focusing and has a positive refractive power. A rear lens subunit L1R is moved during focusing and has a positive refractive power. The front lens subunit L1F and the rear lens subunit L1R are included in the first lens unit L1.

An aperture stop SP regulates an open F-number and is provided on the object side of the fourth lens unit L4.

An imaging plane IP is also provided. When the zoom lens according to the present invention is used as an image taking optical system of a video camera or a digital still camera, the imaging plane IP corresponds to an image pickup surface of a solid-state image pickup element (photoelectric transducer) for receiving an image light, such as a CCD sensor or a CMOS sensor. In a case of a silver-halide film camera, the imaging plane IP corresponds to a film surface thereof.

In the aberration charts, a d-line, a g-line, a C-line, and an F-line are denoted by reference symbols d, g, C, and F, respectively. A meridional imaging plane and a sagittal imaging plane on the d-line are denoted by reference symbols $\Delta Md$ and $\Delta Sd$, respectively. A meridional imaging plane and a sagittal imaging plane on the g-line are denoted by reference symbols $\Delta Mg$ and $\Delta Sg$, respectively. An F-number is denoted by reference symbol Fno, and an image height is denoted by reference symbol Y.

In each of the following embodiments, the wide angle end and the telephoto end correspond to zoom positions when a variable lens unit (second lens unit L2) is located in each of both ends of a range in which the variable lens unit is movable on an optical axis in terms of mechanisms.

In each of the embodiments, as illustrated by arrows of FIGS. 1, 4, 7, and 10, the respective lens units are moved during zooming from the wide angle end to the telephoto end.

Next, a feature of the lens structure in each of the embodiments is described.

The zoom lens according to each of the embodiments includes the first lens unit L1 which includes the focus lens units (variable lens units) and has the positive refractive power, the second lens unit L2 which is a variable system and has the negative refractive power, the third lens unit having the positive refractive power, and the fourth lens unit L4 having the positive refractive power, which are provided in order from the object side to the image side.

The first lens unit L1 includes the front lens subunit L1F having the positive refractive power and the rear lens subunit L1R having the positive refractive power.

During zooming from the wide angle end to the telephoto end, the respective lens units are moved to change respective lens unit intervals as follows. An interval between the first lens unit L1 and the second lens unit L2 at the telephoto end becomes larger than that at the wide angle end. An interval between the second lens unit L2 and the third lens unit L3 at the telephoto end becomes smaller than that at the wide angle end. An interval between the third lens unit L3 and the fourth lens unit L4 at the telephoto end becomes smaller than that at the wide angle end.

Specifically, the second lens unit L2 monotonously moves to the image side on the optical axis and the third lens unit L3 moves along a locus convex to the image side.

In Embodiments 1 and 2 as illustrated in FIGS. 1 and 4, during zooming from the wide angle end to the telephoto end, the rear lens subunit L1R moves to the image side on the optical axis to increase an interval between the front lens subunit L1F and the rear lens subunit L1R in the first lens unit L1.

During focusing in a case where an infinite object is changed into a finite object, the rear lens subunit L1R of the first lens unit L1 is moved in the optical axis direction.

In Embodiments 1 and 2 as illustrated in FIGS. 1 and 4, the rear lens subunit L1R of the first lens unit L1 is moved during zooming, to thereby reduce a height of a light beam passing through the rear lens subunit L1R of the first lens unit L1 at the telephoto end. Therefore, a diameter (effective diameter) of the rear lens subunit L1R of the first lens unit L1 used for focusing decreases to reduce a weight of the first lens unit L1. Thus, the drive mechanism for focusing is reduced in size to achieve a light load.

In each of the embodiments, the front lens subunit L1F includes a negative lens whose object side surface has a convex meniscus shape, a positive lens whose object side surface has a convex shape, and a positive lens whose object side surface has a convex meniscus shape, which are provided in order from the object side to the image side.

The rear lens subunit L1R includes a negative lens whose object side surface has a convex meniscus shape and a positive lens whose object side surface has a convex shape.

The second lens unit L2 includes a negative lens whose image side surface has a concave shape, a cemented lens, and a negative lens whose object side surface has a concave shape. The cemented lens includes a negative lens whose both surfaces have a concave shape and a positive lens, which are cemented to each other.

In each of the embodiments, it is assumed that the positive lens included in the rear lens subunit L1R is identified as a PR lens and the negative lens included in the second lens unit L2 is identified as a N2 lens.

That is, the PR lens is directed to a fifth lens when counting from the object side in numerical embodiments described bellow, and the N2 lens is directed to a seventh lens when counting from the object side.

It is assumed that an Abbe number of a material for the PR lens and the N2 lens is expressed by νd and a partial dispersion ratio thereof is expressed by θgF.

In this case, the material for the PR lens and the N2 lens satisfies the following conditions.

$$60 < \nu d \quad (1)$$

$$-0.0015 \times \nu d + 0.6425 < \theta gF \quad (2)$$

In the zoom lens according to each of the embodiments, the chromatic aberrations are excellently corrected over the entire zoom range and the entire focusing range (entire object length range) to obtain high optical performance. Therefore, extraordinary dispersion glass satisfying the conditional expressions (1) and (2) is used as the material for the PR lens provided in the rear lens subunit L1R of the first lens unit L1 and for the N2 lens provided in the second lens unit L2.

The PR lens made of extraordinary dispersion glass is provided in the rear lens subunit L1R which is used for focusing and has the positive refractive power, to thereby suppress on-axis chromatic aberration and lateral chromatic aberration, which are noticeable on the telephoto end side at the time of focusing on a finite object, from being generated.

In this case, the lateral chromatic aberration on the wide angle end side becomes excessive, and hence the N2 lens made of extraordinary dispersion glass is provided in the second lens unit L2 to correct the lateral chromatic aberration. In the zoom lens according to each of the embodiments, an off-axis light beam passes through a higher position of a lens surface of the second lens unit L2 at the wide angle end. The off-axis light beam passes through a lower position of the lens surface of the second lens unit L2 at the telephoto end.

The N2 lens made of extraordinary dispersion glass is provided in the second lens unit L2 to correct the lateral chromatic aberration generated at the wide angle end in the case where the PR lens made of extraordinary dispersion glass is provided in the rear lens subunit L1R of the first lens unit L1.

The extraordinary dispersion material satisfying the conditional expressions (1) and (2) is used for the PR lens of the rear lens subunit L1R and the N2 lens of the second lens unit L2 to further excellently correct the respective chromatic aberrations, thereby obtaining high optical performance over the entire zoom range and the entire focusing range.

It is assumed that respective refractive indexes of the material with respect to the g-line, F-line, d-line, and C-line of Fraunhofer lines are expressed by ng, nF, nd, and nC. In this case, the Abbe number νd of the material and the partial dispersion ratio θgF thereof are expressed as follows.

$$\nu d = (nd-1)/(nF-nC)$$

$$\theta gF = (ng-nF)/(nF-nC)$$

The conditional expression (1) indicates a condition of the Abbe number of the material for the PR lens of the rear lens subunit L1R and the N2 lens of the second lens unit L2. When the Abbe number of the material is outside the range of the conditional expression (1) and thus becomes smaller, achromatism in a primary spectrum is insufficient, which is not desirable.

The conditional expression (2) indicates a condition of the extraordinary dispersion of the material for the PR lens of the rear lens subunit L1R and the N2 lens of the second lens unit L2. When the partial dispersion ratio of the material is outside the range of the conditional expression (2) and thus becomes smaller, achromatism in a secondary spectrum is insufficient, which is not desirable.

According to the structure as described above, the zoom lens according to each of the embodiments realizes the high optical performance over the entire zoom range and the entire focusing range because the chromatic aberrations are sufficiently corrected.

In each of the embodiments, the structure as described above is employed to obtain the high optical performance over the entire zoom range and the entire focusing range. It is more desirable to satisfy at least one of the following various conditions.

It is assumed that a focal length of the PR lens of the rear lens subunit L1R is expressed by fp and a focal length of the N2 lens of the second lens unit L2 is expressed by fn. It is assumed that a focal length of the first lens unit L1 and a focal length of the second lens unit L2 during focusing on the infinite object at the wide angle end are expressed by f1 and f2, respectively.

It is assumed that a focal length of the entire system at the wide angle end is expressed by fw.

It is assumed that a distance on the optical axis, between an image side surface of the N2 lens and an aperture surface of the aperture stop SP at the wide angle end and a distance on the optical axis, between the image side surface of the N2 lens and the aperture surface of the aperture stop SP at the telephoto end are expressed by dnw and dnt, respectively.

It is assumed that a composite focal length of the first lens unit L1 and the second lens unit L2 at the wide angle end and a composite focal length thereof at the telephoto end during focusing on the infinite object are expressed by f12w and f12t, respectively.

It is assumed that a focal length of the front lens subunit is expressed by f1f and a focal length of the rear lens subunit is expressed by f1r.

In this case, it is desirable to satisfy at least one of the following conditions.

$$0.9 < fp/f1 < 1.8 \quad (3)$$

$$1.5 < fn/f2 < 2.4 \quad (4)$$

$$0.8 < f1/fw < 1.7 \quad (5)$$

$$0.2 < |f2/fw| < 0.60 \quad (6)$$

$$1.5 < dnw/dnt \quad (7)$$

$$2.1 < f12t/f12w < 3.2 \quad (8)$$

$$f12w < 0 \quad (9)$$

$$0.6 < f1r/f1f < 1.2 \quad (10)$$

The conditional expression (3) is a conditional expression for maintaining the balance of aberration correction capability of the PR lens made of the extraordinary dispersion material, of the rear lens subunit L1R of the first lens unit L1. When fp/f1 is smaller than the lower limit of the conditional expression (3) and thus the refractive power of the PR lens is strong, the chromatic aberration correction capability becomes higher, but aberration such as spherical aberration or astigmatism becomes larger. Therefore, it is difficult to correct the aberration.

When fp/f1 exceeds the upper limit of the conditional expression (3) and thus the refractive power of the PR lens is weak, the chromatic aberration correction capability becomes lower. This is not desirable.

The conditional expression (4) is a conditional expression for maintaining the balance of aberration correction capability of the N2 lens made of the extraordinary dispersion material, of the second lens unit L2. When fn/f2 is smaller than the lower limit of the conditional expression (4) and thus the refractive power of the N2 lens is strong, the chromatic aberration correction capability becomes higher, but aberration such as coma aberration or astigmatism becomes larger. Therefore, the aberration correction is difficult. When fn/f2 exceeds the upper limit of the conditional expression (4) and thus the refractive power of the N2 lens is weak, the chromatic aberration correction capability becomes lower. This is not desirable.

The conditional expressions (5) and (6) are conditional expressions for maintaining a balance between the size of the entire zoom lens and the aberration correction.

When f1/fw is smaller than the lower limit of the conditional expression (5) and thus the refractive power of the first lens unit L1 is strong, such a condition contributes to reductions in sizes of the second lens unit L2 and subsequent optical systems, but aberration such as spherical aberration or astigmatism becomes larger. Therefore, the aberration correction is difficult.

When f1/fw exceeds the upper limit of the conditional expression (5) and thus the refractive power of the first lens unit L1 is weak, a total optical system length increases to increase the size of the entire optical system. This is not desirable.

When |f2/fw| is smaller than the lower limit of the conditional expression (6) and thus the refractive power of the second lens unit L2 is strong, aberration such as coma aberration or astigmatism becomes larger. Therefore, the correction becomes difficult. In addition to this, the lens diameters of the third lens unit L3 and the subsequent lens group become larger to increase the sizes. This is not desirable. When |f2/fw| exceeds the upper limit of the conditional expression (6) and thus the refractive power of the second lens unit L2 is weak, a movement amount required for magnification increases to lengthen the entire optical length, thereby increasing the size of the entire zoom lens. This is not desirable.

The conditional expression (7) is a conditional expression for effectively correcting the lateral chromatic aberration of the N2 lens of the second lens unit L2 at the wide angle end. When dnw/dnt is outside the range of the conditional expression (7) and thus the distance of the N2 lens of the second lens unit L2 from the aperture stop SP at the wide angle end is smaller than the distance from the aperture stop SP at the telephoto end, a height of an off-axis light beam at the wide angle end which passes through the N2 lens is insufficient. As a result, a contribution to the correction of the lateral chromatic aberration of the N2 lens made of the extraordinary dispersion material is small. This is not desirable.

The conditional expression (8) is a conditional expression for realizing a balanced increase in zoom ratio while the chromatic aberration correction is effectively performed using the PR lens of the rear lens subunit L1R of the first lens unit L1 and the N2 lens of the second lens unit L2.

The conditional expression (9) indicates that the composite focal length f12w takes a negative value in the case of the conditional expression (8). When f12t/f12w is smaller than the lower limit of the conditional expression (8) and thus the composite focal length of the first lens unit L1 and the second lens unit L2 at the wide angle end is large, the refractive power configuration is provided in which the degree of retro-focus of the entire system at the wide angle end reduces. Therefore, it is difficult to increase the zoom ratio.

In addition to this, an effect obtained by correcting lateral chromatic aberration at the wide angle end using the N2 lens of the second lens unit L2 is weak. This is not desirable. When f12t/f12w exceeds the upper limit of the conditional expression (8) and thus the composite focal length of the first lens unit L1 and the second lens unit L2 at the wide angle end is small, the third lens unit L3 and the subsequent lens group increases in size and it is difficult to correct various negative aberrations generated in the second lens unit L2. This is not desirable.

The conditional expression (10) is a conditional expression related to the focusing capability and various-aberration correction capability of the rear lens subunit L1R of the first lens unit L1.

When f1r/f1f is smaller than the lower limit of the conditional expression (10) and thus the refractive power of the rear lens subunit L1R of the first lens unit L1 is strong, aberration such as spherical aberration or astigmatism becomes larger. Therefore, it is difficult to correct the aberration.

When f1r/f1f exceeds the upper limit of the conditional expression (10) and thus the refractive power of the rear lens subunit L1R of the first lens unit L1 is weak, a moving distance on the optical axis which is required for focusing is long, whereby the size of the optical system becomes larger. In addition to this, a change in chromatic aberration during focusing on a near object increases, and hence it is difficult to correct the change.

When the structure as described above is employed, the zoom lens according to each of the embodiments obtains excellent optical performance. The numerical ranges of the conditional expressions (1) to (8) and (10) are more desirably set as follows.

$$70 < vd \quad (1a)$$

$$-0.0015 \times vd + 0.6475 < \theta gF \quad (2a)$$

$$1.0 < fp/f1 < 1.6 \quad (3a)$$

$$1.6 < fn/f2 < 2.2 \quad (4a)$$

$$0.9 < f1/fw < 1.6 \quad (5a)$$

$$0.25 < |f2/fw| < 0.55 \quad (6a)$$

$$1.7 < dnw/dnt \quad (7a)$$

$$2.3 < f12t/f12w < 3.0 \quad (8a)$$

$$0.7 < f1r/f1f < 1.1 \quad (10a)$$

In each of the embodiments, when the structure as described above is employed, various aberrations represented by a secondary spectrum of the lateral chromatic aberration can be excellently corrected, and hence a zoom lens capable of obtaining a high-quality image over the entire zoom range and the entire focusing range is realized.

Next, an example of a single lens reflex camera system using the zoom lens according to the present invention is described with reference to FIG. 13.

In FIG. 13, a single lens reflex camera main body 10 is provided. An interchangeable lens 11 includes the image taking lens according to the present invention. An image pickup plane 12 corresponding to a film or a photoelectric transducer is provided to record a subject image obtained through the interchangeable lens 11. A finder optical system 13 is provided to observe the subject image from the interchangeable lens 11. A quick return mirror 14 is turned to transmit the subject image from the interchangeable lens 11 to one of the image pickup plane 12 and the finder optical system 13.

When the subject image is to be observed using a finder, the subject image formed on a focusing plate 15 through the quick return mirror 14 is converted into an erect image by a penta prism 16, and then enlarged for observation using an eyepiece optical system 17.

In the case of image taking, the quick return mirror 14 is turned in a direction indicated by an arrow, and the subject image is formed on the image pickup plane 12. A sub mirror 18 and a focus detection device 19 are provided.

As described above, according to the present invention, when the zoom lens is applied to an optical device such as the interchangeable lens of the single lens reflex camera, the optical device having high optical performance can be realized.

The present invention can be applied to a single lens reflex (SLR) camera with no quick return mirror in the same manner.

Hereinafter, Numerical Embodiments 1 to 4 corresponding to Embodiments 1 to 4 are described. In each of the numerical embodiments, "i" denotes a surface order counted from the object side, ri denotes a curvature radius of an i-th surface counted from the object side, and di denotes a member thickness or air interval between the i-th surface and an (i+1)-th surface. In addition, ndi denotes a refractive index of the i-th optical member relative to the d-line and vdi denotes an Abbe number thereof relative to the d-line. In addition, BF denotes a value obtained by performing air conversion on a distance between a final lens surface and the imaging plane.

Table 1 illustrates relationships between the respective conditional expressions described above and various numerical values in the numerical embodiments.

Numerical Embodiment 1 f = 72.1~194.0  FNo = 1: 2.9~2.9  2ω = 33.4°~12.7°

| | | | |
|---|---|---|---|
| r1 = 289.168 | d1 = 2.80 | n1 = 1.74950 | v1 = 35.3 |
| r2 = 113.925 | d2 = 0.96 | | |
| r3 = 136.073 | d3 = 8.52 | n2 = 1.49700 | v2 = 81.5 |
| r4 = −299.563 | d4 = 0.10 | | |
| r5 = 73.100 | d5 = 6.66 | n3 = 1.49700 | v3 = 81.5 |
| r6 = 190.324 | d6 = Variable | | |
| r7 = 51.002 | d7 = 2.20 | n4 = 1.80518 | v4 = 25.4 |
| r8 = 43.113 | d8 = 1.55 | | |
| r9 = 51.352 | d9 = 8.51 | n5 = 1.49700 | v5 = 81.5 |
| r10 = −15551.359 | d10 = Variable | | |
| r11 = −1008.202 | d11 = 1.40 | n6 = 1.80400 | v6 = 46.6 |
| r12 = 34.486 | d12 = 5.76 | | |
| r13 = −81.184 | d13 = 1.40 | n7 = 1.49700 | v7 = 81.5 |
| r14 = 37.378 | d14 = 5.33 | n8 = 1.84666 | v8 = 23.9 |
| r15 = 352.647 | d15 = 2.83 | | |
| r16 = −57.635 | d16 = 1.40 | n9 = 1.69680 | v9 = 55.5 |
| r17 = −199731.253 | d17 = Variable | | |
| r18 = 153.392 | d18 = 5.04 | n10 = 1.67790 | v10 = 55.3 |
| r19 = −90.419 | d19 = 0.15 | | |
| r20 = 1051.897 | d20 = 6.50 | n11 = 1.49700 | v11 = 81.5 |
| r21 = −41.538 | d21 = 1.45 | n12 = 1.83400 | v12 = 37.2 |
| r22 = −104.544 | d22 = Variable | | |
| r23 = 0.000 (Stop) | d23 = 0.39 | | |

-continued f = 72.1~194.0 FNo = 1: 2.9~2.9 2ω = 33.4°~12.7°

| | | | |
|---|---|---|---|
| r24 = 59.410 | d24 = 3.24 | n13 = 1.80400 | ν13 = 46.6 |
| r25 = 173.026 | d25 = 0.49 | | |
| r26 = 42.341 | d26 = 3.38 | n14 = 1.77250 | ν14 = 49.6 |
| r27 = 62.133 | d27 = 1.85 | | |
| r28 = 350.253 | d28 = 1.60 | n15 = 1.74000 | ν15 = 28.3 |
| r29 = 34.471 | d29 = 6.87 | n16 = 1.49700 | ν16 = 81.5 |
| r30 = −135.210 | d30 = 3.70 | | |
| r31 = 260.157 | d31 = 3.69 | n17 = 1.80518 | ν17 = 25.4 |
| r32 = −64.844 | d32 = 1.40 | n18 = 1.58313 | ν18 = 59.4 |
| r33 = 33.633 | d33 = 4.89 | | |
| r34 = −67.742 | d34 = 1.40 | n19 = 1.74400 | ν19 = 44.8 |
| r35 = 1881.652 | d35 = 3.46 | | |
| r36 = 192.183 | d36 = 4.01 | n20 = 1.80400 | ν20 = 46.6 |
| r37 = −73.493 | d37 = 2.48 | | |
| r38 = 164.169 | d38 = 8.87 | n21 = 1.48749 | ν21 = 70.2 |
| r39 = −29.142 | d39 = 2.00 | n22 = 1.83400 | ν22 = 37.2 |
| r40 = −391.790 | d40 = 4.90 | | |
| r41 = 78.138 | d41 = 3.40 | n23 = 1.83400 | ν23 = 37.2 |
| r42 = 306.537 | | | |

| | | | |
|---|---|---|---|
| Focal length | 72.12 | 135.00 | 193.98 |
| F-number | 2.9 | 2.9 | 2.9 |
| Field angle 2ω | 33.4 | 18.2 | 12.7 |
| Image height | 21.6 | 21.6 | 21.6 |
| Total lens length | 183.4 | 183.4 | 183.4 |
| BF | 54.0 | 54.0 | 54.0 |
| Variable interval | | | |
| d6 | 10.72 | 26.51 | 33.79 |
| d10 | 1.58 | 13.45 | 17.30 |
| d17 | 29.09 | 14.44 | 1.09 |
| d22 | 17.39 | 4.38 | 6.62 |

Zoom lens unit data

| Unit | Focal length |
|---|---|
| 1 object side | 177.28 |
| 1 image side | 142.23 |
| 2 | −25.82 |
| 3 | 82.46 |
| 4 | 102.36 |

Numerical Embodiment 2 f = 72.1~194.0 FNo = 1: 2.9~2.9 2ω = 33.4°~12.7°

| | | | |
|---|---|---|---|
| r1 = 314.575 | d1 = 2.80 | n1 = 1.74950 | ν1 = 35.3 |
| r2 = 117.542 | d2 = 0.96 | | |
| r3 = 141.139 | d3 = 8.36 | n2 = 1.49700 | ν2 = 81.5 |
| r4 = −300.657 | d4 = 0.15 | | |
| r5 = 75.124 | d5 = 6.81 | n3 = 1.49700 | ν3 = 81.5 |
| r6 = 218.609 | d6 = Variable | | |
| r7 = 51.382 | d7 = 2.30 | n4 = 1.80518 | ν4 = 25.4 |
| r8 = 43.180 | d8 = 1.43 | | |
| r9 = 50.611 | d9 = 8.60 | n5 = 1.49700 | ν5 = 81.5 |
| r10 = 33115.608 | d10 = Variable | | |
| r11 = −1003.993 | d11 = 1.40 | n6 = 1.80400 | ν6 = 46.6 |
| r12 = 34.333 | d12 = 5.79 | | |
| r13 = −81.909 | d13 = 1.40 | n7 = 1.49700 | ν7 = 81.5 |
| r14 = 36.914 | d14 = 5.39 | n8 = 1.84666 | ν8 = 23.9 |
| r15 = 341.176 | d15 = 2.84 | | |
| r16 = −57.998 | d16 = 1.40 | n9 = 1.69680 | ν9 = 55.5 |
| r17 = 3742.480 | d17 = Variable | | |
| r18 = 169.934 | d18 = 4.88 | n10 = 1.67790 | ν10 = 55.3 |
| r19 = −93.961 | d19 = 0.15 | | |
| r20 = 594.797 | d20 = 6.28 | n11 = 1.43387 | ν11 = 95.1 |
| r21 = −45.332 | d21 = 0.09 | | |
| r22 = −44.317 | d22 = 1.60 | n12 = 1.80100 | ν12 = 35.0 |
| r23 = −93.196 | d23 = Variable | | |

-continued f = 72.1~194.0 FNo = 1: 2.9~2.9 2ω = 33.4°~12.7°

| | | | |
|---|---|---|---|
| r24 = 0.000 (Stop) | d24 = 0.40 | | |
| r25 = 52.860 | d25 = 3.55 | n13 = 1.80400 | ν13 = 46.6 |
| r26 = 160.464 | d26 = 0.20 | | |
| r27 = 51.230 | d27 = 3.52 | n14 = 1.77250 | ν14 = 49.6 |
| r28 = 82.622 | d28 = 1.70 | | |
| r29 = 4742.170 | d29 = 1.60 | n15 = 1.74000 | ν15 = 28.3 |
| r30 = 37.278 | d30 = 7.58 | n16 = 1.49700 | ν16 = 81.5 |
| r31 = −114.057 | d31 = 3.20 | | |
| r32 = 205.849 | d32 = 3.65 | n17 = 1.80518 | ν17 = 25.4 |
| r33 = −72.004 | d33 = 1.40 | n18 = 1.58313 | ν18 = 59.4 |
| r34 = 33.673 | d34 = 4.87 | | |
| r35 = −69.300 | d35 = 1.40 | n19 = 1.74400 | ν19 = 44.8 |
| r36 = 1788.356 | d36 = 3.46 | | |
| r37 = 181.747 | d37 = 3.83 | n20 = 1.80400 | ν20 = 46.6 |
| r38 = −82.196 | d38 = 3.16 | | |
| r39 = 265.558 | d39 = 8.91 | n21 = 1.48749 | ν21 = 70.2 |
| r40 = −27.996 | d40 = 2.00 | n22 = 1.83400 | ν22 = 37.2 |
| r41 = −193.240 | d41 = 5.00 | | |
| r42 = 81.384 | d42 = 3.31 | n23 = 1.83400 | ν23 = 37.2 |
| r43 = 307.388 | | | |

| | | | |
|---|---|---|---|
| Focal length | 72.14 | 135.00 | 193.97 |
| F-number | 2.9 | 2.9 | 2.9 |
| Field angle 2ω | 33.4 | 18.2 | 12.7 |
| Image height | 21.6 | 21.6 | 21.6 |
| Total lens length | 184.7 | 184.7 | 184.7 |
| BF | 54.1 | 54.1 | 54.1 |
| Variable interval | | | |
| d6 | 10.68 | 26.38 | 33.38 |
| d10 | 1.58 | 13.38 | 17.34 |
| d17 | 28.81 | 14.37 | 1.08 |
| d23 | 18.32 | 5.25 | 7.59 |

Zoom lens unit data

| Unit | Focal length |
|---|---|
| 1 object side | 177.23 |
| 2 image side | 142.00 |
| 3 | −25.70 |
| 4 | 83.94 |
| 5 | 100.65 |

Numerical Embodiment 3 f = 72.1~194.0 FNo = 1: 2.9~2.9 2ω = 33.4°~12.7°

| | | | |
|---|---|---|---|
| r1 = 154.603 | d1 = 2.80 | n1 = 1.74950 | ν1 = 35.3 |
| r2 = 91.834 | d2 = 1.82 | | |
| r3 = 128.277 | d3 = 6.26 | n2 = 1.49700 | ν2 = 81.5 |
| r4 = 46844.402 | d4 = 0.10 | | |
| r5 = 70.062 | d5 = 6.77 | n3 = 1.49700 | ν3 = 81.5 |
| r6 = 161.284 | d6 = Variable | | |
| r7 = 65.841 | d7 = 2.20 | n4 = 1.80518 | ν4 = 25.4 |
| r8 = 55.595 | d8 = 2.14 | | |
| r9 = 73.336 | d9 = 8.10 | n5 = 1.49700 | ν5 = 81.5 |
| r10 = −1126.078 | d10 = Variable | | |
| r11 = −290.777 | d11 = 1.40 | n6 = 1.80400 | ν6 = 46.6 |
| r12 = 37.504 | d12 = 5.60 | | |
| r13 = −73.093 | d13 = 1.40 | n7 = 1.49700 | ν7 = 81.5 |
| r14 = 41.486 | d14 = 5.07 | n8 = 1.84666 | ν8 = 23.9 |
| r15 = 799.700 | d15 = 2.56 | | |
| r16 = −62.272 | d16 = 1.40 | n9 = 1.69680 | ν9 = 55.5 |
| r17 = −415.694 | d17 = Variable | | |
| r18 = 168.431 | d18 = 4.78 | n10 = 1.67790 | ν10 = 55.3 |
| r19 = −71.564 | d19 = 0.15 | | |
| r20 = 522.779 | d20 = 5.96 | n11 = 1.49700 | ν11 = 81.5 |
| r21 = −42.691 | d21 = 1.45 | n12 = 1.83400 | ν12 = 37.2 |
| r22 = −143.417 | d22 = Variable | | |
| r23 = 0.000 (Stop) | d23 = 0.47 | | |

-continued f = 72.1~194.0 FNo = 1: 2.9~2.9 2ω = 33.4°~12.7°

| | | | |
|---|---|---|---|
| r24 = 65.579 | d24 = 3.69 | n13 = 1.80400 | ν13 = 46.6 |
| r25 = 486.072 | d25 = 0.20 | | |
| r26 = 55.792 | d26 = 4.53 | n14 = 1.77250 | ν14 = 49.6 |
| r27 = 119.673 | d27 = 1.72 | | |
| r28 = −280.885 | d28 = 1.60 | n15 = 1.74000 | ν15 = 28.3 |
| r29 = 42.162 | d29 = 8.01 | n16 = 1.49700 | ν16 = 81.5 |
| r30 = −92.505 | d30 = 3.20 | | |
| r31 = 6746.347 | d31 = 4.01 | n17 = 1.80518 | ν17 = 25.4 |
| r32 = −56.524 | d32 = 1.40 | n18 = 1.58313 | ν18 = 59.4 |
| r33 = 36.693 | d33 = 4.77 | | |
| r34 = −68.887 | d34 = 1.40 | n19 = 1.74400 | ν19 = 44.8 |
| r35 = 1408.706 | d35 = 3.59 | | |
| r36 = 206.280 | d36 = 3.77 | n20 = 1.80400 | ν20 = 46.6 |
| r37 = −86.805 | d37 = 4.46 | | |
| r38 = 262.909 | d38 = 9.45 | n21 = 1.48749 | ν21 = 70.2 |
| r39 = −30.304 | d39 = 2.00 | n22 = 1.83400 | ν22 = 37.2 |
| r40 = −99.893 | d40 = 5.00 | | |
| r41 = 108.663 | d41 = 2.68 | n23 = 1.83400 | ν23 = 37.2 |
| r42 = 282.792 | d42 = Variable | | |

| | | | |
|---|---|---|---|
| Focal length | 72.13 | 135.00 | 193.98 |
| F-number | 2.9 | 2.9 | 2.9 |
| Field angle 2ω | 34.0 | 18.2 | 12.7 |
| Image height | 21.6 | 21.6 | 21.6 |
| Total lens length | 181.6 | 181.6 | 181.6 |
| BF | 56.1 | 56.1 | 56.1 |
| Variable interval | | | |
| d6 | 14.69 | 14.69 | 14.69 |
| d10 | 2.00 | 27.55 | 36.60 |
| d17 | 24.93 | 12.70 | 1.08 |
| d22 | 14.05 | 0.72 | 3.28 |

Zoom lens unit data

| Unit | Focal length |
|---|---|
| 1 object side | 212.43 |
| 2 image side | 196.35 |
| 3 | −28.05 |
| 4 | 80.89 |
| 5 | 98.56 |

Numerical Embodiment 4 f = 72.1~194.0 FNo = 1: 2.9~2.9 2ω = 33.4°~12.7°

| | | | |
|---|---|---|---|
| r1 = 178.396 | d1 = 2.80 | n1 = 1.74950 | ν1 = 35.3 |
| r2 = 96.817 | d2 = 1.92 | | |
| r3 = 141.267 | d3 = 6.63 | n2 = 1.49700 | ν2 = 81.5 |
| r4 = −796.577 | d4 = 0.10 | | |
| r5 = 70.062 | d5 = 6.78 | n3 = 1.49700 | ν3 = 81.5 |
| r6 = 160.912 | d6 = Variable | | |
| r7 = 60.738 | d7 = 2.20 | n4 = 1.75520 | ν4 = 27.5 |
| r8 = 52.804 | d8 = 2.43 | | |
| r9 = 71.240 | d9 = 8.45 | n5 = 1.43387 | ν5 = 95.1 |
| r10 = −708.169 | d10 = Variable | | |
| r11 = −297.561 | d11 = 1.40 | n6 = 1.80400 | ν6 = 46.6 |
| r12 = 37.661 | d12 = 5.57 | | |
| r13 = −71.442 | d13 = 1.40 | n7 = 1.49700 | ν7 = 81.5 |
| r14 = 41.860 | d14 = 5.23 | n8 = 1.84666 | ν8 = 23.9 |
| r15 = 852.898 | d15 = 2.51 | | |
| r16 = −62.738 | d16 = 1.40 | n9 = 1.69680 | ν9 = 55.5 |
| r17 = −418.998 | d17 = Variable | | |
| r18 = 173.450 | d18 = 4.69 | n10 = 1.67790 | ν10 = 55.3 |
| r19 = −72.652 | d19 = 0.15 | | |
| r20 = 883.115 | d20 = 5.85 | n11 = 1.49700 | ν11 = 81.5 |
| r21 = −42.273 | d21 = 1.45 | n12 = 1.83400 | ν12 = 37.2 |
| r22 = −132.104 | d22 = Variable | | |
| r23 = 0.000 (Stop) | d23 = 0.39 | | |
| r24 = 62.489 | d24 = 3.69 | n13 = 1.80400 | ν13 = 46.6 |

-continued f = 72.1~194.0 FNo = 1: 2.9~2.9 2ω = 33.4°~12.7°

| | | | |
|---|---|---|---|
| r25 = 346.067 | d25 = 0.20 | | |
| r26 = 56.940 | d26 = 5.26 | n14 = 1.77250 | ν14 = 49.6 |
| r27 = 121.261 | d27 = 1.67 | | |
| r28 = −292.931 | d28 = 1.60 | n15 = 1.74000 | ν15 = 28.3 |
| r29 = 41.019 | d29 = 8.00 | n16 = 1.49700 | ν16 = 81.5 |
| r30 = −94.863 | d30 = 3.20 | | |
| r31 = 2600.152 | d31 = 4.01 | n17 = 1.80518 | ν17 = 25.4 |
| r32 = −56.623 | d32 = 1.40 | n18 = 1.58313 | ν18 = 59.4 |
| r33 = 37.268 | d33 = 4.66 | | |
| r34 = −70.799 | d34 = 1.40 | n19 = 1.74400 | ν19 = 44.8 |
| r35 = 1687.221 | d35 = 3.60 | | |
| r36 = 199.804 | d36 = 3.81 | n20 = 1.80400 | ν20 = 46.6 |
| r37 = −85.157 | d37 = 4.81 | | |
| r38 = 218.272 | d38 = 9.53 | n21 = 1.48749 | ν21 = 70.2 |
| r39 = −30.190 | d39 = 2.00 | n22 = 1.83400 | ν22 = 37.2 |
| r40 = −117.780 | d40 = 5.00 | | |
| r41 = 99.886 | d41 = 2.80 | n23 = 1.83400 | ν23 = 37.2 |
| r42 = 265.603 | | | |

| | | | |
|---|---|---|---|
| Focal length | 72.13 | 135.00 | 193.98 |
| F-number | 2.9 | 2.9 | 2.9 |
| Field angle 2ω | 34.0 | 18.2 | 12.7 |
| Image height | 21.6 | 21.6 | 21.6 |
| Total lens length | 183.9 | 183.9 | 183.9 |
| BF | 55.1 | 55.1 | 55.1 |
| Variable interval | | | |
| d6 | 15.00 | 15.00 | 15.00 |
| d10 | 1.98 | 27.47 | 36.56 |
| d17 | 24.90 | 12.73 | 1.08 |
| d22 | 14.04 | 0.73 | 3.28 |

Zoom lens unit data

| Unit | Focal length |
|---|---|
| 1 object side | 209.80 |
| 2 image side | 201.45 |
| 3 | −28.10 |
| 4 | 82.56 |
| 5 | 96.77 |

TABLE 1

Conditional expression number

| | Embodiment 1 | Embodiment 2 | Embodiment 3 | Embodiment 4 | |
|---|---|---|---|---|---|
| (1) | 81.5 | 81.5 | 81.5 | 95.1 | 81.5 |
| (2) | 0.520 < 0.539 | 0.520 < 0.539 | 0.520 < 0.539 | 0.500 < 0.537 | 0.520 < 0.539 |
| (3) | 1.23 | 1.23 | 1.28 | 1.37 | |
| (4) | 1.99 | 1.99 | 1.89 | 1.88 | |
| (5) | 1.16 | 1.15 | 1.51 | 1.52 | |
| (6) | 0.36 | 0.36 | 0.39 | 0.39 | |
| (7) | 2.28 | 2.23 | 2.35 | 2.35 | |
| (8) | 2.70 | 2.69 | 2.68 | 2.67 | |
| (10) | 0.80 | 0.80 | 0.92 | 0.96 | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-142352, filed May 30, 2008, which is hereby incorporated by reference herein in its entirety.

What is claimed is:

1. A zoom lens, comprising, in order from an object side to an image side:

a first lens unit having a positive refractive power;

a second lens unit which has a negative refractive power and includes a negative lens; and a subsequent lens group including at least one lens unit, wherein at least the second lens unit is moved on an optical axis so as to increase an interval between the first lens unit and the second lens unit during zooming from a wide angle end to a telephoto end, wherein the first lens unit comprises:

a front lens subunit which is not moved during focusing and has a positive refractive power; and a rear lens subunit which is moved during the focusing and has a positive refractive power, wherein the rear lens subunit includes a positive lens, wherein the positive lens included in the rear lens subunit is identified as a PR lens and the negative lens included in the second lens unit is identified as a N2 lens, and wherein the PR lens and the N2 lens are made of a material satisfying the following conditions:

$$60 < vd; \text{ and}$$

$$-0.0015 \times vd + 0.6425 < \theta gF,$$

where $vd$ denotes an Abbe number of the material and $\theta gF$ denotes a partial dispersion ratio of the material.

2. A zoom lens according to claim 1, wherein the following conditions are satisfied:

$$0.9 < fp/f1 < 1.8; \text{ and}$$

$$1.5 < fn/f2 < 2.4,$$

where $fp$ denotes a focal length of the PR lens, $fn$ denotes a focal length of the N2 lens, and $f1$ and $f2$ denote a focal length of the first lens unit and a focal length of the second lens unit, respectively, during focusing on an infinite object at the wide angle end.

3. A zoom lens according to claim 1, wherein the following conditions are satisfied:

$$0.8 < f1/fw < 1.7; \text{ and}$$

$$0.2 < |f2/fw| < 0.60,$$

where $fw$ denotes a focal length of an entire system at the wide angle end, and $f1$ and $f2$ denote a focal length of the first lens unit and a focal length of the second lens unit, respectively, during focusing on an infinite object at the wide angle end.

4. A zoom lens according to claim 1, further comprising an aperture stop which is located on the image side of the second lens unit and has an aperture surface, wherein the following condition is satisfied $$1.5 < dnw/dnt,$$

where $dnw$ denotes a distance on the optical axis, between a surface of the N2 lens which is located on the image side and the aperture surface of the aperture stop at the wide angle end, and $dnt$ denotes a distance on the optical axis, between the surface of the N2 lens which is located on the image side and the aperture surface of the aperture stop at the telephoto end.

5. A zoom lens according to claim 1, wherein the following conditions are satisfied:

$$2.1 < f12t/f12w < 3.2; \text{ and}$$

$$f12w < 0,$$

where $f12w$ and $f12t$ denote a composite focal length of the first lens unit and the second lens unit at the wide angle end and a composite focal length thereof at the telephoto end, respectively, during focusing on an infinite object.

6. A zoom lens according to claim 1, wherein the following condition is satisfied $$0.6 < f1r/f1f < 1.2,$$

where $f1f$ denotes a focal length of the front lens subunit and $f1r$ denotes a focal length of the rear lens subunit.

7. A zoom lens according to claim 1, wherein, during the zooming, the front lens subunit is not moved and the rear lens subunit is moved.

8. A zoom lens according to claim 1, wherein the subsequent lens group comprises, in order from the object side to the image side:

a third lens unit having a positive refractive power; and a fourth lens unit having a positive refractive power.

9. A zoom lens according to claim 8, wherein, during the zooming from the wide angle end to the telephoto end, the second lens unit is monotonously moved to the image side and the third lens unit is moved along a locus convex to the image side.

10. A zoom lens according to claim 1, wherein the front lens subunit comprises, in order from the object side to the image side:

a negative lens having an object side surface in a convex meniscus shape;

a positive lens having an object side surface in a convex shape; and a positive lens having an object side surface in a convex meniscus shape.

11. A zoom lens according to claim 1, wherein the rear lens subunit comprises, in order from the object side to the image side:

a negative lens having an object side surface in a convex meniscus shape; and a positive lens having an object side surface in a convex shape.

12. A zoom lens according to claim 1, wherein the second lens unit comprises, in order from the object side to the image side:

a negative lens having an image side surface in a concave shape;

a cemented lens which includes a negative lens having both surfaces in a concave shape and a positive lens, which are cemented to each other; and a negative lens having an object side surface in a concave shape.

13. An image pickup apparatus, comprising:

the zoom lens according to claim 1; and a solid-state image pickup element for receiving light of an image formed by the zoom lens.

* * * * *